US012671652B1

(12) United States Patent
Sharma et al.

(10) Patent No.: US 12,671,652 B1
(45) Date of Patent: Jun. 30, 2026

(54) RESTORING CONTAINER CONNECTIVITY FOR CONTAINERIZED ROUTERS

(71) Applicant: Juniper Networks, Inc., Sunnyvale, CA (US)

(72) Inventors: Shailender Sharma, Bangalore (IN); Vinod Nair, San Jose, CA (US); Faisal Chishti, Bengaluru (IN); Sachchidanand Vaidya, Santa Clara, CA (US); Vinay K Nallamothu, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 111 days.

(21) Appl. No.: 18/890,498

(22) Filed: Sep. 19, 2024

(51) Int. Cl.
  *H04L 45/586* (2022.01)
  *H04L 45/02* (2022.01)

(52) U.S. Cl.
  CPC ............ *H04L 45/586* (2013.01); *H04L 45/02* (2013.01)

(58) Field of Classification Search
  CPC .............................. H04L 45/586; H04L 45/02
  See application file for complete search history.

(56) References Cited

U.S. PATENT DOCUMENTS 9,560,081 B1 * 1/2017 Woolward .......... G06F 9/45558
9,571,394 B1 2/2017 Sivaramakrishnan et al.

10,728,145 B2 * 7/2020 Rao ......................... H04L 41/22
10,855,531 B2 * 12/2020 Vaidya ................ H04L 41/0806
11,575,572 B2 2/2023 Nagaprakash et al.
2017/0244593 A1 * 8/2017 Rangasamy ........ H04L 67/1097
2020/0067763 A1 * 2/2020 Vytla ................... H04L 41/0806
2021/0351982 A1 * 11/2021 Albrecht ............. H04L 41/0806
2022/0086081 A1 * 3/2022 Weis ........................ H04L 45/22
2025/0071047 A1 * 2/2025 Wang ....................... H04L 45/14

FOREIGN PATENT DOCUMENTS

WO 2013184846 A1 12/2013

OTHER PUBLICATIONS

Kiran KN et al., "Day One: Contrail DPDK vRouter", Juniper Networks, Inc., Jan. 2021, 196 pp.
Mali et al., "Day One: Cloud Native Routing with cRPD", Juniper Networks, Inc., Aug. 2021, 93 pp.
Rosen et al., "BGP/MPLS IP Virtual Private Networks (VPNs)", rfc4364, RFC Editor, Feb. 2006, 47 pp.

* cited by examiner

*Primary Examiner* — El Hadji M Sall
(74) *Attorney, Agent, or Firm* — Juniper Networks, Inc.

(57) ABSTRACT

In general, this disclosure describes techniques for automatically re-attaching containers to a containerized router after uninstallation and re-installation of the containerized router. A containerized router may read container attachment information from memory, where the container attachment information is persisted to memory by a prior instance of the containerized router. The containerized router may configure the containerized router with the container attachment information to enable network communications by a logically-related group of one or more containers via the containerized router.

20 Claims, 6 Drawing Sheets

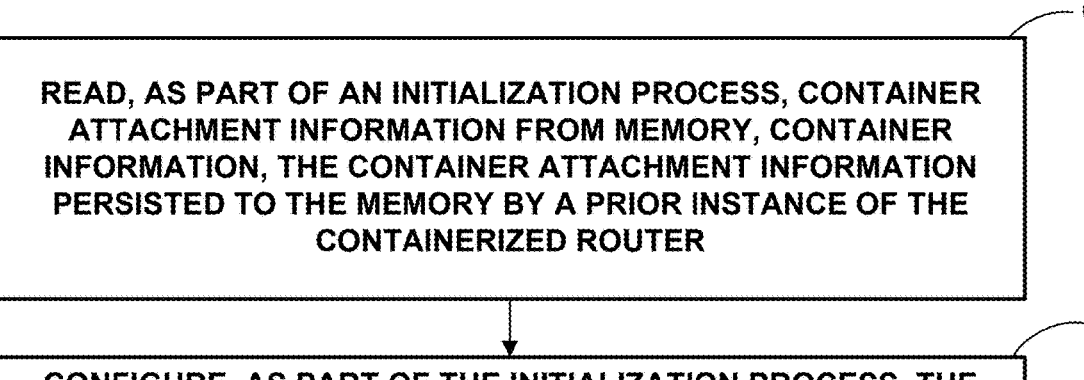

602

READ, AS PART OF AN INITIALIZATION PROCESS, CONTAINER ATTACHMENT INFORMATION FROM MEMORY, CONTAINER INFORMATION, THE CONTAINER ATTACHMENT INFORMATION PERSISTED TO THE MEMORY BY A PRIOR INSTANCE OF THE CONTAINERIZED ROUTER

604

CONFIGURE, AS PART OF THE INITIALIZATION PROCESS, THE CONTAINERIZED ROUTER WITH THE CONTAINER ATTACHMENT INFORMATION TO ENABLE NETWORK COMMUNICATIONS BY A LOGICALLY-RELATED GROUP OF ONE OR MORE CONTAINERS VIA THE CONTAINERIZED ROUTER

FIG. 6

RESTORING CONTAINER CONNECTIVITY FOR CONTAINERIZED ROUTERS

TECHNICAL FIELD

The disclosure relates to virtualized computing infrastructure and, more specifically, to a containerized router for use in a cloud computing environment.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center or any environment that includes one or more servers can provide several advantages. One advantage is that virtualization can provide significant improvements to efficiency. As the underlying physical computing devices (i.e., servers) have become increasingly powerful with the advent of multicore micro-processor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operating system-level virtualization. Containers are light-weight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, this disclosure describes techniques for restoring connectivity of a container to a containerized network router (CNR) after reinstallation of the CNR. The CNR may include a virtual router (vRouter) and a containerized routing protocol daemon (cRPD). The cRPD is a routing protocol process that is packaged and deployed as a container. The CRPD may be executed in the user space of the host as a containerized process. Thus, cRPD makes available the rich routing software pedigree of physical routers on compute nodes. The cRPD provides control plane functionality for the CNR. This control plane is thus containerized.

The CNR virtual router is a software entity that provides data plane functionality on the compute node. The compute node may be hosting containers that are centrally orchestrated and provisioned. In some cases, the virtual router may further interact with an SDN controller to create overlay networks by exchanging routes, configurations, and other data. A virtual router can run as either a kernel module or a data plane development kit (DPDK)-enabled process, for instance. DPDK allows a virtual router to process more packets per second than is possible when running as a kernel module. The virtual router data plane may be containerized. In combination, the containerized cRPD and containerized virtual router may thus be a fully functional, containerized router.

An orchestration system, such as Kubernetes, may deploy containers using pods or other deployment construct for a logically-related group of one or more containers. Kubernetes networking between pods is via plug-ins called Container Network Interfaces (CNIs) (also known as Container Network Interface plugins). An orchestrator may use CNI to configure virtual network interfaces for virtual network endpoints, such as pods. For example, when a pod is created, an orchestrator may use CNI to create virtual network interfaces to connect the pod to a virtual router and enable communication between the pod and the virtual router, and between the pod and other endpoints. This may involve configuring the cRPD based on the network attachment definitions, configuring the pod with a proper Internet Protocol (IP) address and routes, as well as other configurations, and adding a virtual network interface for the pod to the virtual router.

The CNR may be uninstalled and reinstalled from a server. For example, to upgrade an older version of the CNR to a newer version of the CNR, the older version of the CNR is uninstalled from the server, and the newer version of the CNR can then be installed on the server. Because pods may continue to run on the server after the CNR is uninstalled, the pods may lose connectivity to the CNR when the CNR is uninstalled. However, because the CNI may only be triggered upon creation of a new pod, a newly installed or reinstalled CNR may have no way to restore connectivity to such pods that continue to run on the server.

Aspects of this disclosure relate to techniques for restoring connectivity of a container—whether deployed using a pod or other deployment construct—to a CNR after the CNR has been uninstalled and then reinstalled. When a pod is created and connected to the CNR via CNI, the CNR may persist, for the pod, information that is used to create virtual network interfaces to connect the pod to the CNR and configuration information used by the CNR to facilitate pod communication with other endpoints. When the CNR is uninstalled and then reinstalled, the CNR may use the persisted information to re-add and configure virtual network interfaces for the pod to the CNR and to connect the pod to the CNR via the virtual network interfaces.

The techniques may provide one or more technical advantages that realize at least one practical application. For example, the techniques enable a CNR that is installed on a server to automatically restore connectivity to containers running on the server that were previously connected to the CNR prior to uninstallation and re-installation of the CNR. The techniques enable the CNR to automatically restore connectivity to containers without restarting the pods and without receiving requests from the CNI to connect to the containers, which may reduce the time it may take for the CNR to re-attach to containers running on the server and thereby reduce negative effects of lost connectivity of such containers. In the context of mobile networks, this may include dropped calls or inability to make calls, lost data sessions or data, or other negative effects.

In some aspects, the techniques described herein relate to a computing device including: memory; processing circuitry communicably coupled to the memory; a containerized router configured to execute on the processing circuitry, wherein the containerized router includes a containerized virtual router configured to implement a data plane for the containerized router and a containerized routing protocol process configured to implement a control plane for the containerized router, wherein the containerized router is configured to, as part of a containerized router initialization process: read container attachment information from the memory, the container attachment information persisted to the memory by a prior instance of the containerized router; and configure the containerized router with the container attachment information to enable network communications by a logically-related group of one or more containers via the containerized router.

In some aspects, the techniques described herein relate to a method including: reading, by a containerized router executing on processing circuitry as part of an initialization process, container attachment information from memory, the container attachment information persisted to the memory by a prior instance of the containerized router, wherein the containerized router includes a containerized virtual router configured to implement a data plane for the containerized router and a containerized routing protocol process configured to implement a control plane for the containerized router; and configuring, by the containerized router executing on the processing circuitry as part of the initialization process, the containerized router with the container attachment information to enable network communications by a logically-related group of one or more containers via the containerized router.

In some aspects, the techniques described herein relate to non-transitory computer-readable storage media, storing instructions, which when executed by processing circuitry of a computing device, cause the processing circuitry to: reading, by a containerized router executing on the processing circuitry, container attachment information from memory, the container attachment information persisted to the memory by a prior instance of the containerized router, wherein the containerized router includes a containerized virtual router configured to implement a data plane for the containerized router and a containerized routing protocol process configured to implement a control plane for the containerized router; and configuring, by the containerized router executing on the processing circuitry, the containerized router with the container attachment information to enable network communications by a logically-related group of one or more containers via the containerized router.

The details of one or more examples of this disclosure are set forth in the accompanying drawings and the description below. Other features, objects, and advantages will be apparent from the description and drawings, and from the claims.

BRIEF DESCRIPTION OF DRAWINGS

FIG. 6 is a flowchart illustrating an example technique for reattaching pods to a virtual router, according to techniques of this disclosure.

Like reference characters denote like elements throughout the description and figures.

Figure 1:
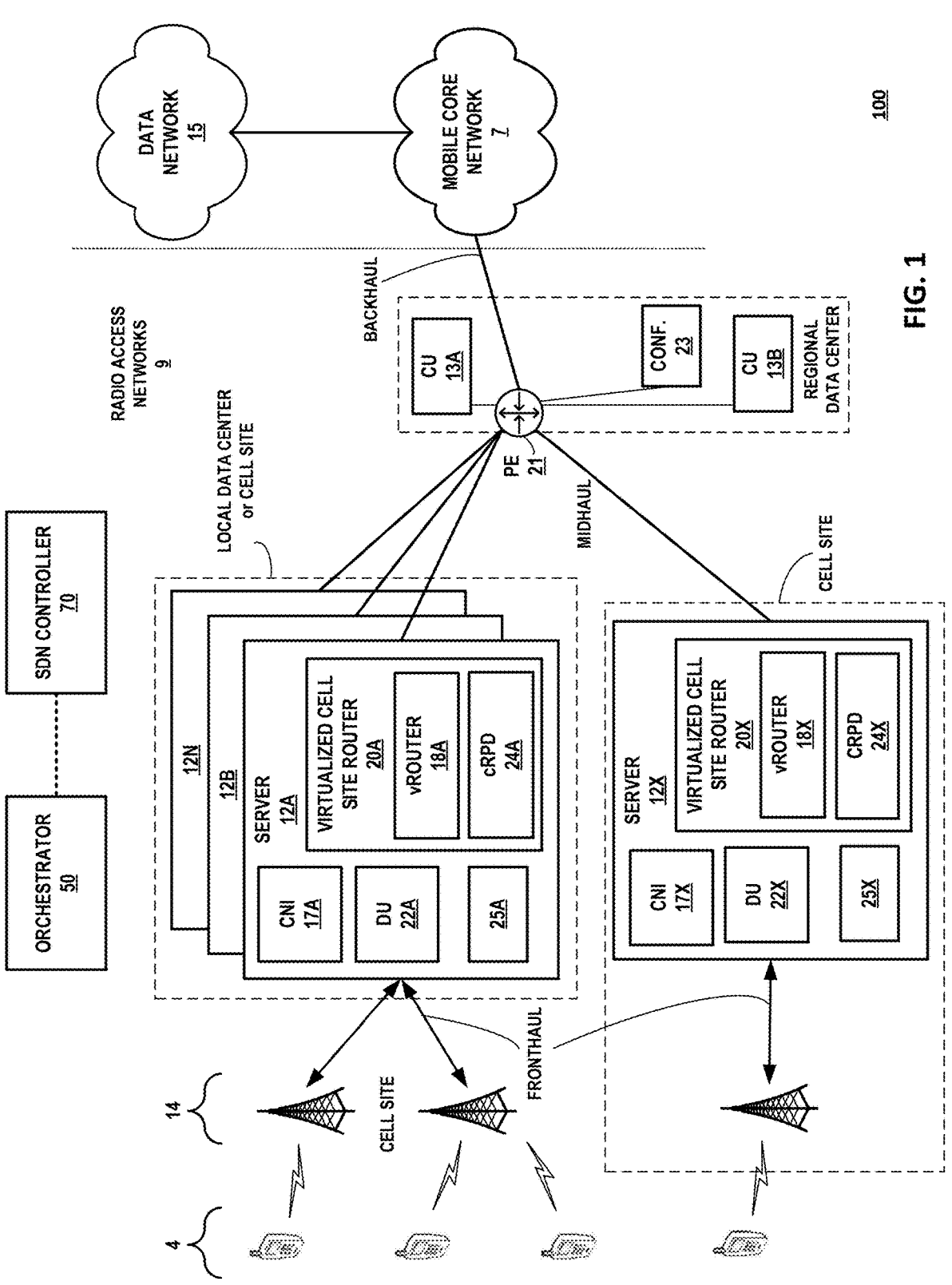
FIG. 1 is a block diagram illustrating an example mobile network system, in accordance with techniques described in this disclosure.

DETAILED DESCRIPTION 5G mobile networking relies on radio technology that will require a large number of cells and base stations. 5G uses a cloud-native approach in which functional blocks are decomposed into microservices. The microservices are deployed as containers on x86 platforms, orchestrated by Kubernetes (abbreviated as "K8s"). This includes 5G core control plane functions such Access and Mobility Management Function (AMF) and Session Management Function (SMF), RAN control plane functions such as centralized unit control plane (CU-CP), service management and orchestration (SMO), Near-Real Time & Non-Real Time Radio Intelligent Controller (RIC) and even some data-plane functions such as CU-DP and distributed unit (DU).

Kubernetes networking between pods is via plug-ins called Container Networking Interfaces (CNIs) (also known as Container Network Interface plugins). However, the networking capabilities of typical CNIs are rather rudimentary and not suitable when the containerized network functions the CNI serves play a pivotal role within a telecommunications network. A containerized router, as described herein, provides a better fit for these situations. A containerized router allows an ×86 or ARM based host to be a first-class member of the network routing system, participating in protocols such as Intermediate System to Intermediate System (IS-IS) and Border Gateway Protocol (BGP) and providing Multiprotocol Label Switching/Segment Routing (MPLS/SR) based transport and multi-tenancy. In other words, rather than the platform being an appendage to the network (like a customer edge (CE) router), it may be operating as a provider edge (PE) router.

A containerized router may have one or more advantages over a conventional physical router. A router has a control plane and a forwarding plane. The control plane participates in dynamic routing protocols and exchanges routing information with other routers in the network. It downloads the results into a forwarding plane, in the form of prefixes, next-hops and associated SR/MPLS labels. Implementations described herein are modular, in the sense that the control plane is agnostic to the exact details of how the forwarding plane is implemented. In a hardware router, the forwarding plane may be based on custom ASICs. In contrast, the containerized router is a virtualized router. However, the routing protocol software is functionally similar in both cases. This means the containerized router benefits from the same highly comprehensive and robust protocol implementation as the hardware-based routers that underpin some of the world's largest networks.

The containerized router uses a containerized routing protocol daemon (cRPD) Control Plane and a virtual router (vRouter) forwarding plane to deliver high performance networking in a small footprint, software package that is functionally similar to a non-virtual router, a physical network function (PNF). The forwarding plane may be implemented via a choice of Data Plane Development Kit (DPDK), Linux Kernel or Smart-NIC. The complete integration delivers a K8s CNI-compliant package, deployable within a K8s environment (e.g., Multus-enabled).

The containerized router may be incorporated into the host on which it resides and integrated with K8s. By way of example, this disclosure describes how a DU and a containerized router can co-exist on the same 1U size ×86 or ARM based host or other computing device. This is especially attractive for those cell-sites that have limited power and space, as it avoids the need for a two-box solution, in the form of a separate DU and router. Multiple Open Distributed Units (O-DUs), which are specific types of DUs, or other workloads, can be attached to the same containerized router.

The cell-site server may be a Kubernetes worker node (or "minion"). The Open Distributed Unit (O-DU) pod is plumbed into the containerized router. The O-DU may require multiple network interfaces, facilitated in some cases by the Multus meta-CNI. Each of these interfaces can be mapped into a different Layer 3 VPN on the containerized router to support multiple network slices. A CNI described herein, when triggered by K8s pod events, dynamically adds or deletes interfaces between the pod and the vRouter container. It also dynamically updates the cRPD control plane container with host routes for each pod interface and corresponding Layer 3 VPN mappings, in the form of Route Distinguishers and Route Targets. The Layer 3 VPNs may be implemented using virtual routing and forwarding instances (VRFs). In turn, the cRPD control plane programs the vRouter forwarding plane accordingly via a gRPC interface. In this way, the Cloud Native Router is introduced into the data path, supporting the F1 interfaces to the CUs running in edge or regional DC sites. While described primarily with respect to O-RAN applications such as the Distributed Units, the containerized router techniques are applicable for configuring host-based virtual router for other containerized applications.

As the containerized router is itself a cloud-native application, it supports installation using Kubernetes manifests or Helm Charts. These include the initial configuration of the router, including routing protocols and Layer 3 VPNs to support slices. A containerized router may be orchestrated and configured, in a matter of seconds, with all of the routing protocol adjacencies with the rest of the network up and running. Ongoing configuration changes during the lifetime of the containerized router, for example to add or remove network slices, may be via a choice of CLI, K8s manifests, NetConf or Terraform.

By adopting a K8s CNI framework, the containerized router may mitigate the traditional operational overhead incurred when using a containerized appliance rather than its physical counterpart. By exposing the appropriate device interfaces, the containerized router may normalize the operational model of the virtual appliance to the physical appliance, eradicating the barrier to adoption within the operator's network operations environment. The containerized router may present a familiar routing appliance look-and-feel to any trained operations team. The containerized router has similar features and capabilities, and a similar operational model as a hardware-based platform. Likewise, a domain-controller can use the protocols that it is uses with any other Junos router to communicate with and control the containerized router, for example Netconf/OpenConfig, gRPC, Path Computation Element Protocol (PCEP) and Programmable Routing Daemon (pRPD) APIs.

The node executing containerized router may participate in IS-IS, Open Shortest Path First (OSPF), BGP, and/or other interior or exterior routing protocols. In addition, MPLS may be used, often based on Segment Routing (SR). The reason for this is two-fold: to allow Traffic Engineering if needed, and to underpin multi-tenancy, by using MPLS-based Layer 3 VPNs. As an alternative, SRv6 could be used instead to fulfill these requirements. Having a comprehensive routing capability is also necessary to implement network slicing. Each slice tenant is placed into its own Layer 3 VPN. The containerized router acts as a provider edge (PE) router from the Layer 3 VPN point of view. The containerized router can therefore exchange Layer 3 VPN prefixes via BGP with other PE routers in the network, regardless of whether those other PEs are physical routers or containerized routers residing on other hosts. Each tenant may be placed in a separate VRF table on each PE, giving the correct degree of isolation and security between tenants, just as with a conventional Layer 3 VPN service. This neatly solves the problem that Kubernetes does not natively provide such isolation. Layer 3 VPN is a tried and tested method for achieving multi-tenancy in networking and is trusted by the many major corporations worldwide who buy this service from their network service providers. In addition to Layer 3 VPN services, the techniques may be used to provision other VPN services such as Virtual Private LAN Service (VPLS), Ethernet VPNs, or other Layer 2 or Layer 3 VPNs.

Usually, the transport network offers a variety of paths, each tuned to a particular cost-function such as minimum latency or high-bandwidth. These are implemented using Segment Routing flex-algo or RSVP or Segment Routing-based traffic engineering. When traffic-engineering is used, the paths can be computed by a controller and communicated to the Cloud-Native Router via the PCEP protocol. When the controller detects congestion in the network via streaming telemetry, it automatically recomputes the affected paths to case the congestion. PE routers, including the containerized routers, apply tags (BGP color communities) to the prefixes in a given VRF according to the type of path that the corresponding slice needs. For example, a first slice may need the lowest latency transport that is possible, and so is mapped to a low-latency path in order to reach the O-CU in an Edge Data Center (EDC). A second slice needs high bandwidth with reasonably low latency. Therefore, its O-CU is also located in the EDC, and the traffic is mapped to a high-bandwidth path to the EDC. A third slice needs high-bandwidth transport but is not latency-sensitive, so its O-CU may be placed in the Regional Data Center (RDC). Traffic for the third slice is mapped into the high-bandwidth path to the RDC. In actual deployments, in which there will be many more slices, the mapping of slices to a transport path will normally be many-to-one. For example, all of the slices that need low-latency transport between a given pair of endpoints share the same low-latency traffic-engineered or flex-algo path that connects those two endpoints.

The containerized router may in this way bring the full spectrum of routing capabilities to compute platforms that host containerized network functions. This may allow the platform to fully participate in the operator's network routing system and facilitate multi-tenancy and network slicing. It may provide the same familiar look-and-free, operational experience and control-plane interfaces as a hardware-based router.

The containerized router may operate within a cloud native orchestration framework. In the Kubernetes orchestration framework, containerized applications are deployed using a logically-related group of one or more containers ("Pod"). The Pod may support the Data Plane Development Kit (DPDK) to support fast path packet communication on a data channel between a virtual router and the Pod. A container networking interface plugin (CNI) is a networking solution for application containers and is a runtime executable that assists with configuring interfaces between containers and other components of the computing device ("host") hosting the container, which may be a member of a pod. The computing device may be alternatively referred to as a "compute node" or "server". The CNI typically assigns the network address (e.g., IP address) to the network interface and may also add routes relevant for the interface, such as routes for the default gateway and one or more nameservers.

A virtualized cell-site router is described with containerized applications for implementing distributed units (DUs) on compute nodes. At least in some cases, the compute nodes include a DPDK-based virtual router for the data plane.

A containerized routing protocol daemon (cRPD) is a routing protocol process that is packaged as a container to run in Linux-based environments. Thus, cRPD is a containerized routing protocol process. cRPD may be executed in the user space of the host as a containerized process. Thus, cRPD makes available the rich routing software pedigree of physical routers on Linux-based compute nodes. cRPD provides control plane functionality. Existing implementations of cRPD (running on the host) use the forwarding provided by the Linux kernel. This control plane is thus containerized.

A virtual router is the software entity that provides data plane functionality on the compute node. The compute node may be hosting virtual machines or containers centrally orchestrated and provisioned. The virtual router may work with an SDN controller to create the overlay network by exchanging routes, configurations, and other data. A virtual router can run as either a Linux kernel module or a DPDK-based process. DPDK allows a virtual router to process more packets per second than is possible when running as a kernel module. This virtual router data plane may be containerized. In combination, the containerized cRPD and containerized DPDK-based virtual router may thus be a fully containerized router. In some examples of the containerized router, however, only the cRPD is deployed as a container, and the virtual router can be kernel-based or SmartNIC-based.

The compute node may be used to implement parts of a (5$^{th}$ generation) cellular network using cloud-native, Open Radio Access Network ("O-RAN" or "Open RAN") architecture. The cloud may be built with containers and Kubernetes. The cell-site router functionality may be realized on compute nodes that host Distributed Unit (DU) 5G functionality as containerized applications. That is, DU functionality may be realized as Kubernetes Pods on these compute nodes. At a very high level, the DU functionality will consume RAN traffic, process it, and send it over tunnels to the Control Unit functionality (CU) hosted in a data center.

To meet the rich routing functionality and forwarding performance requirements for this 5G network use case, the compute nodes may be configured to use an integrated scheme in which a cRPD running on the compute node operates as the control plane and configures a DPDK-based virtual router as a corresponding fast path forwarding plane for mobile network traffic that is to be processed by a containerized DU.

A containerized routing protocol daemon (cRPD) can interface with two separate data planes of a compute node on which is executes: the kernel network stack for the compute node and the DPDK-based virtual router. The cRPD may leverage the kernel's networking stack to set up routing exclusively for the DPDK fast path. The routing information cRPD receives can include underlay routing information and overlay routing information. The cRPD may run routing protocols on the vHost interfaces that are visible in the kernel, and the cRPD may install forwarding information base (FIB) updates corresponding to interior gateway protocol (IGP)-learned routes (underlay) in the kernel FIB (e.g., to enable establishment of multi-hop interior Border Gateway Protocol (iBGP) sessions to those destinations). Concurrently, the DPDK-based virtual router may notify the cRPD about the Application Pod interfaces created by the CNI for the compute node. Such Pod interfaces may not be advertised to or otherwise made known to the kernel. The cRPD may advertise reachability to these Pod interfaces to the rest of the network as, e.g., L3VPN network layer reachability information (NLRI). Corresponding Multi-Protocol Label Switching (MPLS) routes may be programmed on the virtual router but not to the kernel, for the next-hop of these labels is a "POP and forward" operation to the Pod interface, and these interfaces are only visible in the virtual router. Similarly, reachability information received over BGP L3VPN may only be programmed to the virtual router, for only PODs need such reachability information for forwarding. That is, the kernel may not have any use for or applications that need such reachability information.

When adding the DPDK interface to an application Pod instantiated on a compute node, the CNI may also add a second, management interface into the application Pod. The management interface may be configured on a different data plane within the compute node than from the active data plane on which the active interface is configured. For example, the active data plane may be a DPDK-based virtual router, while the backup data plane may be a kernel-based virtual router.

A set of software components provides CNI functionality that address networking requirements unique to cloud native 5G network environments. The software components include a containerized routing protocol daemon (cRPD) and may support a Network Service Mesh (NSM) architecture. The set of software components support NSM architecture and may provide additional capabilities such as hybrid networking (between physical and virtual infrastructure), direct reachability to a Pod from outside a cluster of compute nodes to, e.g., advertise over protocols such as BGP, set up tunnels dynamically using various technologies such as MPLS, SRv6, IP-IP/VxLAN/GRE, IPsec, etc. In a use case of this aspect, a 5G O-RAN network may be deployed using cloud native technologies and follow the 5G split in which the DU (Distributed Unit) and CSR (Cell Site Router) are virtualized and run on a compute node. The set of software components may operate as a cell-site router to provide L3 reachability for the mid-haul for the 5G network.

The software components use cRPD to distribute Layer 3 (L3) network reachability information of the Pods not just within the cluster, but also outside the cluster. The cRPD also programs the data plane on each compute node. For better network packet I/O performance, the DU application may run in the application Pod to bypass the kernel networking stack and abstractions, and thereby use, e.g., zero-copy mechanisms to directly send/receive packets from the physical NIC. Data Plane Development Kit (DPDK) is one such framework, and a DPDK-based virtual router may be used as a user space data plane that leverages DPDK for high forwarding performance for this purpose.

The software components may include a DPDK-based virtual router to support DPDK applications. A CNI plugin manages the DPDK configuration for application and programs the virtual router. This may include setting up a vhost control channel and assigning IP (e.g., both IPv4 and IPv6) and MAC addresses, advertising the Pod IP addresses, and detecting and withdrawing the routes when the Pod is considered down or removed.

The various aspects described in this disclosure may be used together in any combination of the aspects. "DAY ONE: CONTRAIL DPDK vROUTER," 2021, Kiran K N et al., Juniper Networks, Inc., is incorporated by reference herein in its entirety. "DAY ONE: CLOUD NATIVE ROUTING WITH CRPD," 2021, Hitesh Mali et al., Juniper Networks, Inc., is incorporated by reference herein in its entirety.

The CNI plugin may communicate with the DPDK-based virtual router and the cRPD of the containerized router to attach (i.e., connect) Pods to the virtual router. This may involve, for a Pod, configuring the cRPD based on the network attachment definitions for the Pod, configuring the Pod with a proper Internet Protocol (IP) address and routes, as well as other configurations, and adding a virtual network interface for the Pod to the vRouter. Attaching a Pod to the virtual router configures the virtual router to enable network communications by the Pod via the virtual router.

In accordance with aspects of this disclosure, the containerized router may, for a Pod that is attached via the CNI plugin to the virtual router, determine container attachment information for the Pod, which is information used by the DPDK-based virtual router and the cRPD of the containerized router to attach the Pod to the virtual router. The container attachment information for the Pod may include interface information for the virtual network interface added to the virtual router for the Pod, such as the IP address, a name for the virtual network interface, and the like. The container attachment information for the Pod may also include configuration information for the virtual network interface, such as the type of the interface, the mode of the interface, and the like, as well as the routes programmed for the virtual network interface. The containerized router may persist, in memory, the container attachment information for the Pod in memory.

Subsequently, after the containerized router is uninstalled (e.g., deleted) from the server and is re-installed at the server, the re-installed containerized router may re-attach Pods that are running on the server to the containerized router using the container attachment information for each of the Pods. The virtual router of the re-installed containerized router may, for a Pod, re-add a virtual network interface attached to the Pod based on the interface information for the virtual network interface persisted by the prior instance of the containerized router, and the cRPD of the re-installed containerized router may read the persisted configuration information for the virtual network interface from the memory and may push configuration information for the virtual network interface to the virtual router to configure the re-added virtual network interface. In this way, a re-installed containerized router may re-attach Pods running on the server to the virtual router.

FIG. 1 is a block diagram illustrating an example mobile network system, in accordance with techniques described in this disclosure. Mobile network system 100 may be a 5G network that implements 5G standards promulgated by, e.g., the 3$^{rd}$ Generation Partnership Project (3GPP), the Open Radio Access Network ("O-RAN" or "ORAN") Alliance, the European Telecommunications Standards Institute (ETSI), the Internet Engineering Task Force (IETF), and the International Telecommunication Union (ITU).

5G networks allow for disaggregation of mobile fronthaul and midhaul networks by building then around cloud native principles. As a result, service providers may avoid becoming locked into particular appliance vendors and may combine effective solutions from different vendors at different layers and locations to build and provision the mobile network system. This can improve the radio access networks (RANs), in particular, by making them more open, resilient, and scalable.

O-RAN-based networks decompose the baseband unit (BBU) found in traditional telco networks into three functional units: a Radio Unit (RU), a Distributed Unit (DU), and a Centralized Unit (CU). Different functions of RUs, DUs, and CUs may be implemented by software executed by x86-based or ARM-based host servers. The CU can be further segregated into distinct control plane (CU-CP) and user plane (CU-UP) functions to further control and user plane separation (CUPS). This decoupling helps bring flexibility to deployment—different combinations of RU, DU, and CU may be deployed at the same location, or at different locations. For example, where latency is critical, RU, DU, and CU can be placed together at the edge. DUs and CUs that conform to O-RAN are often referred to as Open Distributed Units (O-DUs) and Open Centralized Units (O-CUs), respectively. Additional data plane elements known as user plane functions (UPFs) operate in mobile core network 7 to forward traffic between the CU and data network 15. Additional control plane elements operate in mobile core network 7. These control plane elements include Network Slice Selection Function (NSSF), Policy Control Function (PCF), Authentication Server Function (ASUF), Access and Mobility Management Function (AMF), Network Exposure Function (NEF), Network Function Repository Function (NRF), Application Function (AF), Unified Data Management (UDM), and Session Management Function (SMF).

Mobile network system 100 includes radio access networks 9 and mobile core network 7. Radio access networks 9 include RUs 14 located at various cellular network sites ("cell sites"). Each RU 14 consists of an LO PHY and a RF transmitter. The LO PHY component may be implemented using specialized hardware for high-performance packet processing.

RUs 14 connect to DUs 22A-22X (collectively, "DUs 22") via the fronthaul network. The fronthaul network connects LO PHY and HI PHY and is used by RUs 14 and DUs 22 to implement the F2 interface of 5G. DUs 22 manage the packet transmission of radio by the RUs 14. In some cases, such packet transmission conforms to the Common Packet Radio Interface (CPRI) and/or to the enhanced CPRI (eCPRI) standard, or to IEEE 1914.3. DUs 22 may implement the Radio Link Control (RLC), Media Access Control (MAC), and the HI PHY layer. DUs 22 are at least partially controlled by CUs 13A-13B (collectively, "CUs 13").

DUs 22 connect to CUs 13 via the midhaul network including provider edge (PE) router 21. The midhaul network may be used by DUs 22 and CUs 13 to implement the F1 of 5G. CUs 13 may implement the Radio Resource Control (RRC) and Packet Data Convergence Protocol (PDCP) layers. CUs 13 connect to mobile core network 7 via a backhaul network. The midhaul and backhaul networks may each be wide area networks (WANs).

In radio access networks 9 of mobile network system 100, the gNodeB includes one of CUs 13 and one of DUs 22. A CU may support multiple DUs to implement multiple gNodeBs. And one or more RUs may be supported by a single DU. Thus, for example with respect to FIG. 1, CU 13A and DU 22A and one of RUs 14 may form one eNodeB, while CU 13A and DU 22B (of server 12B) and another one of RUs 14 may form another eNodeB.

As shown in FIG. 1, any DU of DUs 22 may or may not be located at the cell site that includes the RU(s) 14 supported by the DU. DU 22X is located at the cell site, while DUs 22A-22N are located at a local data center and collectively support multiple RUs 14. Mobile network system 100 may have radio access networks 9 that include many thousands of cell sites, each having one or more RUs 14 and optionally one or more DUs 22. Whether located at a cell site or offsite, a DU is typically within 20 km of the supported RUs. CUs 13 are shown in FIG. 1 as located at a regional data center, typically within 40 km of the supported DUs 22. RUs may be layer 3 endpoints.

Radio access networks 9 connect to mobile core network 7 to exchange packets with data network 15. Mobile core network 7 may be a 5G core network, and data network (DN) 15 may represent, for example, one or more service provider networks and services, the Internet, 3$^{rd}$ party services, an IP-multimedia subsystem, or other network.

Mobile network system 100 includes multiple servers 12A-12X to execute DUs 22. Each of servers 12 may be a real or virtual server that hosts/executes software that implements DUs 22. Such software may include one or more applications deployed as, e.g., virtual machine or containers, to servers 12. Servers 12A-12N may in some cases be located in a local data center or cell site. Servers 12A-12N are connected in a physical topology that forms a physical layer 2 network. Some of servers 12A-12N may in some examples connect to one another in a daisy-chain topology whereby, e.g., server 12A has a physical link to a switch or PE router 21, while server 12B has a physical link to server 12A but not to the switch or PE router 21.

While not shown in FIG. 1, CUs 13 may also be executed by servers. The combination of DUs 22, the midhaul network, CUs 13, and the backhaul network effectively implement an IP-based transport network between the radio units 14 and mobile core network 7.

A multi-stage process is used to provision a containerized applications and VPN service in virtualized cell site routers 20A-20X ("vCSRs 20A-20X" and collectively, "vCSRs 20") to provide virtual network connectivity among DUs 22 and CUs 13, for instance. A vCSR 20 may be executed on the same server 12 as one or more DUs 22 to provide provider edge router functionality to such DUs 22. Although each of vCSRs 20 is termed a "cell site" router, any of vCSRs 20 may be deployed to a local data center together with one or more DUs 22 for which the vCSR provides IP services, as shown with respect to vCSRs 20A-20N, i.e., where the local data center includes servers 12 that execute DUs 22 for one or more cell sites.

Each of vCSRs 20 is implemented using one of containerized routing protocol daemons 24A-24X ("cRPDs 24A-24X" and collectively, "cRPDs 24"). More specifically, each of vCSRs 20 uses a corresponding cRPD of cRPDs 24 as a control plane for implementing a layer 3 router. The cRPD provides control plane routing functions. For example, the cRPD can execute IP (IPv4/IPv6) underlay routing protocols such as Intermediate System-Intermediate System (IS-IS) and Border Gateway Protocol (BGP); advertise reachability of DUs 22 both inside and outside a cluster, e.g., to CUs 13; implement network namespaces (supported using L3VPN and EVPN Type-2/Type-5 advertisements); implement Access Control Lists (ACLs) and network policies for security, network isolation, and quality of service (QoS); support tunnels and tunneling protocols (e.g., MPLS, SR-MPLS, SRv6, SR-MPLSoIPv6, SR-MPLSoIPv4, VxLAN, IP-in-IP, GRE); support dynamic tunnels signaled using BGP; support encryption for IPSec tunnels; and program a forwarding plane of the vCSR of the server with learned and/or configured routing information to provide layer 3 packet forwarding, encapsulation, packet filtering, and/or QoS between one or more of DUs 22 and one of CUs 13.

Each of CSRs 20 also includes one of virtual routers 18A-18X ("vRouters 18A-18X" and collectively referred to herein as "vRouters 18") that implements a forwarding plane for one of vCSRs 20. Each of vRouters 18 may be a Data Plane Development Kit (DPDK)-enabled virtual router. In such examples, each of vRouters 18 uses DPDK as a data plane. In this mode, Each of vRouters 18 runs as a user space application that is linked to the DPDK library (not shown). This is a performance version of a virtual router and is commonly used by telecommunications companies, where the VNFs are often DPDK-based applications. The performance of each of vRouters 18 as a DPDK virtual router can achieve ten times higher throughput than a virtual router operating as a kernel-based virtual router. The physical interface is used by DPDK's poll mode drivers (PMDs) instead of Linux kernel's interrupt-based drivers.

For example, vCSR 20A executed by server 12A includes cRPD 24A and vRouter 18A that is a forwarding plane of server 12A (e.g., a SmartNIC, kernel-based forwarding plane, or Data Plane Development Kit (DPDK)-based forwarding plane). cRPD 24A provides one or more of the above routing functions to program vRouter 18A of vCSR 20A in order to, among other tasks, advertise a layer 3 route for DU 22A outside of the cluster—including across the midhaul network via PE router 21 to CU 13A—and forward layer 3 packets between DU 22A and CU 13A. In this way, the techniques realize cloud-native, virtualized cell site routers 20 implemented by containers and executing on the same servers 12 as containerized DUs 22, thus significantly reducing latency on the midhaul between DUs 22 and CUs 13.

Provider edge (PE) router 21 operates as a gateway router for radio access network 9 and may be considered a metro PE in that it aggregates traffic for the access network toward the service delivery points. Although not shown, the midhaul network may include one or more layer 2 switches, such as Top-of-Rack (TOR) switches, aggregation, or chassis switches, additional P (core) or PE routers, and so forth. The backhaul network may include one or more layer 2 switches, such as Top-of-Rack (TOR) switches, aggregation, or chassis switches, additional P (core) or PE routers, and so forth.

vCSRs 20 as containerized routers allow an x86-based or ARM-based host to be a first-class member of the network routing system, participating in protocols such as IS-IS and BGP and providing MPLS/SR-based transport and multi-tenancy. Thus, rather than being appendages to the network (similar to a customer edge (CE) router), vCSRs 20 may operate as provider edge (PE) routers for networks transporting layer 3 packets among DUs 22, CUs 13, and mobile core network 7.

Moreover, in some examples, the integration of cRPDs 24 and host-based forwarding planes may also deliver a Kubernetes CNI-compliant package that is deployable within a Kubernetes environment. The execution by a single server of a DU 22 and a vCSR 20 together can avoid a two-box solution with a separate DU and router, potentially reducing costs, power, and space requirements, which is particularly attractive for cell sites. Application workloads can be containerized network functions (CNFs), such as DUs.

Orchestrator 50 represents a container orchestration platform. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS. Accordingly, although described herein primarily with respect to connecting a virtual router and containers deployed using Kubernetes Pods, the techniques apply to other deployment constructs such as container instances, Docker service, ECS Task, or OpenShift Pods. The deployment constructs are referred to herein as a "logically-related group of one or more containers."

Orchestrator 50 orchestrates DUs 22 and at least containerized RPDs 24 of vCSRs 20. In some examples, the data plane of vCSRs 20 is also containerized and orchestrated by orchestrator 50. The data plane may be a DPDK-based virtual router, for instance.

Containers, including those implementing containerized routing protocol daemons 24, may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master node" and "minion nodes," while the Docker Swarm platform refers to cluster managers and cluster nodes. Servers 12 or virtual machines thereon may represent cluster nodes.

Orchestrator 50 and software defined network (SDN) controller 70 may execute on separate computing devices or execute on the same computing device. Each of orchestrator 50 and SDN controller 70 may each be a distributed application that executes on one or more computing devices. Orchestrator 50 and SDN controller 70 may implement respective master nodes for one or more clusters each having one or more minion nodes implemented by respective servers 12. In general, SDN controller 70 controls aspects of the network configuration of radio access network 9 to facilitate packetized communications among DUs 22, CUs 13, and mobile core network 7. SDN controller 70 may distribute routing and configuration information to the control plane elements of radio access networks 9, in particular, to cRPDs 24. SDN controller 70 may, for instance, program segment routing headers, configure L3VPNs, configure VRFs in routers of radio access network 9 (including virtualized cell site routers 20). SDN controller 70 may implement one or more southbound protocols for configuring router, switches, and other networks devices of the midhaul and backhaul networks, as well as for configuring vCSRs 20. Example southbound protocols may include Path Computation Element Protocol (PCEP), BGP, Netconf, OpenConfig, another protocol for configuring cRPDs 24, and so forth. Additional information regarding L3VPNs is found in "BGP/MPLS IP Virtual Private Networks (VPNs)," Request for Comments 4364, Network Working Group of Internet Engineering Task Force, February 2006, which is incorporated by reference in its entirety.

SDN controller 70 may provide a logically and in some cases physically centralized controller. In some examples, SDN controller 70 may operate in response to configuration input received from orchestrator 50 and/or an administrator/operator. SDN controller 70 may program NFV infrastructure (NFVI) such as servers 12, network switches/routers, and/or other network infrastructure. In the case of NFVI programming, SDN controller 70 may configure aspects of the operating system kernel to configure L3 IP routing, Linux bridges, iptables, network namespaces, and/or virtual switches.

Additional information of an example SDN controller 70, virtual router, and virtual router agent is found in International Application Number PCT/US2013/044378, filed Jun. 5, 2013, and entitled "PHYSICAL PATH DETERMINATION FOR VIRTUAL NETWORK PACKET FLOWS;" U.S. patent application Ser. No. 14/226,509, filed Mar. 26, 2014, and entitled "Tunneled Packet Aggregation for Virtual Networks;" and in U.S. patent application Ser. No. 17/305, 110, filed Jun. 30, 2021, and entitled "Network Controller Horizontal Scaling for Network Device Configurations Session Management;" each which is incorporated by reference as if fully set forth herein.

In general, orchestrator 50 controls the deployment, scaling, and operations of containers across clusters of servers 12 and the providing of computing infrastructure, which may include container-centric computing infrastructure. Orchestrator 50 and, in some cases, SDN controller 70 may implement respective cluster masters for one or more Kubernetes clusters. As an example, Kubernetes is a container management platform that provides portability across public and private clouds, each of which may provide virtualization infrastructure to the container management platform.

Existing mobile networks use a physical cell site router that is located on or close to each BBU. Physical routers often have specialized form factors, are relatively difficult to update and configure, and are relatively difficult to replace due to vendor lock-in effects. While these effects are tolerable where there are relatively few cell sites, as with 3G and 4G/LTE mobile networks, the comparatively large number of cell sites required by RANs for 5G mobile networks exacerbates the capital and operational costs related to these effects. And although 5G network providers are moving to a disaggregated RAN architecture (e.g., O-RAN), such networks still rely on a physical cell site router or a virtual machine-based router to manage routes and data traffic between the DU and the CU over the midhaul network.

Virtualized cell site routers 20 having containerized routing protocol daemons 24 alleviate many of the negative effects of deploying physical or VM-based routers at the cell site. For example, containerized RPDs 24 are more lightweight in terms of compute resources (CPU, memory) compared to VM-based routers and may be more efficient in terms of space and power utilization than VM-based and physical routers. Virtualized CSRs 20 may achieve these advantages while achieving comparable performance where DPDK-based virtual routers are used as the data plane to provide efficient and high packet I/O rate for vCSRs 20 to communicate with DUs 22. That is, having vCSR 20A and DU 22A (e.g., an O-DU) on a single physical server 12A with DPDK-based data plane can offer packet forwarding performance on par with a physical cell site router. As further examples of technical advantages, vCSRs 20 eliminate the need for physical cell site router and may reduce the space, reduce power consumption, and also reduce capital/operational expenditures.

Additionally, in some examples and as described in further detail below, vCSRs 20 can be integrated into a Kubernetes infrastructure by presenting vCSRs 20 as Container Networking Interfaces (CNIs) to the orchestration platform, usable for configuring networking for the application workloads. Thus, by deploying containerized vCSRs 20/RPDs 24 for use as CNIs, integrating into mobile network system 100, and integrating into Kubernetes, the techniques may facilitate a cloud native experience for vCSR 20 deployment and configuration. Integrating in Kubernetes permits leveraging its existing mechanisms for monitoring the health of containerized RPD 24s and restarting if necessary, along with managing the life-cycle of the vCSRs 20 and in particular, containerized RPDs 24.

Servers 12 include Container Networking Interfaces 17A-17X ("CNIs 17A-17X" and collectively referred to herein as "CNIs 17") that configure virtual network interfaces for virtual network elements. Orchestrator 50 and the orchestration platform may use CNIs 17 to manage networking for Kubernetes Pods, such as DUs 22. For example, CNI 17A may (e.g., in response to creation of DU 22A at server 12A)

create one or more virtual network interfaces to connect DU 22A to vCSR 20A (e.g., to vRouter 18A) and may enable containers of DU 22A to communicate, via the one or more virtual network interfaces, to other virtual network endpoints over the virtual networks. CNI 17A may, for example, insert a virtual network interface for a virtual network into the network namespace for containers in DU 22A and configure (or request to configure) the virtual network interface for the virtual network in vRouter 18A, such that vRouter 18A is configured to send packets received from the virtual network via the virtual network interface to containers of DU 22A and to send packets received via the virtual network interface from containers of DU 22A on the virtual network. CNI 17A may assign a network address (e.g., a virtual IP address for the virtual network), configure the virtual network interface, and may set up routes for the virtual network interface. In Kubernetes, by default all pods can communicate with all other pods without using network address translation (NAT). In some cases, the orchestrator 50 may create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 50. When a user creates an isolated namespace for a pod, orchestrator 50 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network.

Each one of CNIs 17 may represent a library, a plugin, a module, a runtime, or other executable code for one of servers 12. Each one of CNIs 17 may conform, at least in part, to the Container Network Interface (CNI) specification or the rkt Networking Proposal. Each of CNIs 17 may represent a Contrail, OpenContrail, Multus, Calico, cRPD, or other CNI. Each one of CNIs 17 may alternatively be referred to as a network plugin or CNI plugin or CNI instance. Separate CNIs may be invoked by, e.g., a Multus CNI to establish different virtual network interfaces for DUs 22.

CNI 17A may be invoked by, e.g., orchestrator 50. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g., a router). Containers can be conceptually added to or removed from one or more networks. The CNI specification specifies a number of considerations for a conforming plugin ("CNI plugin").

Orchestrator 50 may deploy and provision containerized applications, such as cRPD 24A, DU 22A, and vRouter 18A, to server 12A. Such provisioning can include configuring the cRPD 24A, vRouter 18A, and DU 22A with network configurations such as IP addresses or virtual IP addresses.

For example, orchestrator 50 may receive a network attachment definition (NAD), container specification data, Pod specification data, or Container Networking Interface (CNI) configuration that causes orchestrator to direct a CNI plugin such as CNI 17A to use IP Address Management (IPAM) to assign an IP address for cRPD 24A, vRouter 18A, and/or DU 22A. cRPD 24A, vRouter 18A, and DU 22A, which are containerized applications, are provisioned accordingly. In some examples, orchestrator 50 and SDN controller 70 coordinate to configure network interfaces for cRPD 24A, vRouter 18A, and DU 22A.

As described above, when a Pod, such as DU 22A is deployed and/or created at server 12A, CNI 17A may attach the Pod's network interface to vRouter 18A. To attach a Pod to vRouter 18A, CNI 17A sends, to vCSR 20A, a request to attach the Pod's network interface to vRouter 18A. In response, vRouter 18A may create one or more virtual network interfaces that attaches to the Pod's network interface based on the request, and cRPD 24A may configure the one or more virtual network interfaces attached to the Pod, thereby enabling vCSR 20A to perform routing and/or switching of traffic to and from the Pod via the virtual network interface.

vCSR 20A may, in response to receiving the request from CNI 17A, determine container attachment information 25A for attaching the Pod to vRouter 18A, and may attach the Pod's network interface to vRouter 18A based on the container attachment information 25A. vCSR 20A, in some examples, determines container attachment information 25A for attaching the Pod to vRouter 18A based on the request from CNI 17A.

Servers 12A-12X include container attachment information 25A-25X. The container attachment information 25A for a Pod includes interface information for one or more virtual network interfaces for the Pod and configuration information for configuring the one or more virtual network interfaces. For example, the request may include or otherwise specify interface information for the one or more virtual network interfaces for the Pod, such as a virtual network address (e.g., an IP address) for each of the one or more virtual network interfaces, a subnet of each of the one or more virtual network interfaces, and the like. In other examples, vRouter 18A may derive such interface information based on the container attachment information 25A without the container attachment information 25A being included or specified by the request.

vRouter 18A may attach the Pod's network interface to vRouter 18A by creating the one or more virtual network interfaces for the Pod according to the interface information. That is, vRouter 18A may create the one or more virtual network interfaces having the specific one or more virtual network addresses and subnets, and the like. To attach the Pod's network interface to vRouter 18A, vRouter 18A configures itself to enable network communications by the Pod via the one or more virtual network interfaces of vRouter 18A.

The container attachment information 25A may also include configuration information for the one or more virtual network interfaces. Such configuration information may include information for configuring the one or more network interfaces, such as a type (e.g., veth, virtio, vhost, fabric interface etc.) of each of the one or more virtual network interfaces, an interface mode (e.g., access, trunk, L3, etc.) of each of the one or more virtual network interfaces, and the like. Such configuration information may also include route information for the one or more virtual network interfaces, such as a VRF identifier for each of the one or more virtual network interfaces for the Pod, a virtual local area network (VLAN) identifier for each of the one or more virtual network interfaces for the Pod, service labels, routes, forwarding information for the routes, and next-hops for each of the one or more virtual network interfaces, and the like.

To attach the Pod's network interface to vRouter 18A, cRPD 24A may also configure each of the one or more virtual network interfaces for the Pod in vRouter 18A based on the configuration information for the one or more virtual network interfaces, to enable network communications by the Pod via the one or more virtual network interfaces. For example, CRPD 24A may configure each of the one or more virtual network interfaces for the Pod in vRouter 18A with the corresponding VRF identifier and VLAN identifier, the corresponding type and/or mode, and the like, and may add corresponding service labels, routes, forwarding information for the routes, next-hops, and the like to each of the one or more virtual network interfaces according to the configuration information.

In accordance with aspects of this disclosure, vCSR 20A may persist (i.e., store) container attachment information 25A for attaching the Pod to vRouter 18A in memory (e.g., a storage device) of server 12A. For example, after vCSR 20A determines the container attachment information for attaching a Pod (e.g., DU 22A) to vRouter 18A, vCSR 20A may persist the container attachment information 25A in memory. vCSR 20A may store the container attachment information 25A in any suitable format, such as text files, as structured or unstructured data, as a database file, and the like. Persisting the container attachment information 25A in memory may include storing the container attachment information 25A in a persisted form, such that the container attachment information 25A is persisted through installs and re-installs of instances of vCSR 20A.

In some examples, vCSR 20A may store the interface information for one or more virtual network interfaces for the Pod and the configuration information for the one or more virtual network interfaces in separate files, such as in different text files, different data structures, different database files, and the like. For example, vRouter 18A may store the interface information for one or more virtual network interfaces for the Pod in a first file in memory, and cRPD 24A may store the configuration information for the one or more virtual network interfaces in a second file in memory.

After vCSR 20A attaches a Pod such as DU 22A to vRouter 18A, and saves the container attachment information for the Pod in memory, vCSR 20A may be uninstalled from server 12A, and a new instance of vCSR 20A is installed on server 12A. For example, when a newer version of vCSR 20A is available to be installed on server 12A, a user (e.g., an administrator) may uninstall the older version of vCSR 20A from server 12A and may install the newer version of vCSR 20A on server 12A. Such uninstallation and re-installation of vCSR 20A may include deleting one or more containers in which an older version of vCSR 20A executes and creating one or more new containers for re-installing a newer version of vCSR 20A. The uninstalled instance of vCSR 20A is referred to herein as a prior instance of vCSR 20A, while the subsequently installed instance of vCSR 20A is referred to herein as a current instance of vCSR 20A.

After the current instance of vCSR 20A is installed on server 12A, the current instance of vCSR 20A may re-attach Pods currently running on server 12A, which were previously attached to the prior instance of vCSR 20A.

To re-attach a Pod's network interface to vRouter 18A of the current instance of vCSR 20A, vRouter 18A may create one or more virtual network interfaces for the Pod according to the interface information for the Pod stored in memory with persisted container attachment information 25A, as persisted by the prior instance of vRouter 18A. That is, vRouter 18A may create, in vRouter 18A, one or more virtual network interfaces having the one or more virtual network addresses and subnets specified in interface information for the Pod, and the like.

To re-attach a Pod's network interface to vRouter 18A of the current instance of vCSR 20A, cRPD 24A of the current instance of vCSR 20A may also configure each of the one or more virtual network interfaces for the Pod in vRouter 18A based on the configuration information stored in memory with container attachment information 25A for the one or more virtual network interfaces, as persisted by the prior instance of vCSR 20A. For example, cRPD 24A may configure each of the one or more virtual network interfaces for the Pod in vRouter 18A with the one or more interface types specified in the configuration information for the Pod, in the one or more interface modes specified in the configuration information for the Pod, and the like. cRPD 24A may also configure each of the one or more virtual network interfaces with the corresponding VRF identifier and VLAN identifier, and the like, as specified by the configuration information for the Pod, and may add corresponding service labels, routes, forwarding information for the routes, next-hops, and the like, as specified by the configuration information for the Pod, to each of the one or more virtual network interfaces. In this way, the current instance of vCSR 20A may configure itself with container attachment information 25A persisted to the memory by the prior instance of vCSR 20A to enable network communications by the Pod via vCSR 20A.

Figure 2:
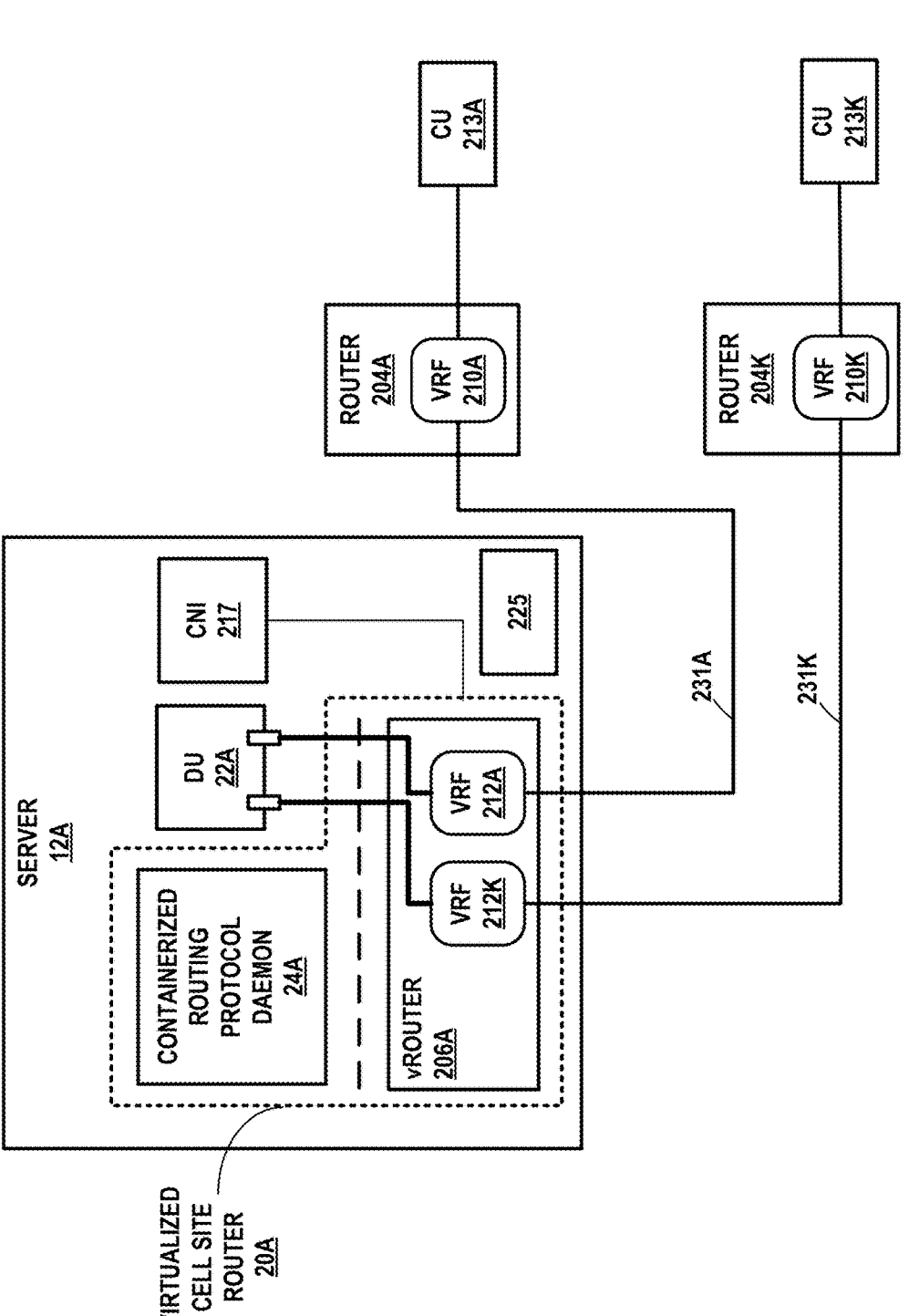
FIG. 2 is a block diagram illustrating an example implementation of a part of the mobile network system of FIG. 1 in further detail, in accordance with techniques of this disclosure.

FIG. 2 is a block diagram illustrating an example implementation of a part of the mobile network system of FIG. 1 in further detail, in accordance with techniques of this disclosure. System 200 includes CUs 213A-213K, each of which may represent any of CUs 13. In an example, multiple network slices (e.g., 5G network slices) are implemented using L3VPNs and tunnels 231A-231K to connect DU 22A to different CUs 213A-213K for respective network slices.

One of the primary technical challenges facing service providers today is the ability to deliver a wide array of network performance characteristics that future services will demand. To name a few, bandwidth, latency, packet loss, security, and reliability will greatly vary from one service to the other. Emerging applications such as remote operation of robots, massive Internet-of-Things (IoT), and self-driving cars require connectivity, but with vastly different characteristics. The combination of architecture flexibility, software programmability, and needs of different business segments (medical, factories, military, public safety, etc.) and applications have led to the creation of the concept of network slicing. A network slice provides a way to completely segment the mobile network to support a particular type of service or business or even to host service providers (multi-tenancy) who do not own a physical network. Furthermore, each slice can be optimized according to capacity, coverage, connectivity, security and performance characteristics. Since the slices can be isolated from each other, as if they are physically separated both in the control and user planes, the user experience of the network slice will be the same as if it was a separate network. A network slice can span all domains of the network including software applications (both memory and processing) running on network nodes, specific configurations of the core transport network, access network configurations as well as the end devices.

The network slicing enables multiple operators to share a mobile network securely but by separating their own users from others, and different applications of a user to use different network slices that provide widely different performance characteristics.

Virtualized cell site router 20A includes a virtual router forwarding plane (vRouter) 206A configured with VRFs 212A-212K (collectively, "VRFs 212") for respective network slices implemented with respective L3VPNs, which vCSR 20A and routers 204A-204B implement using tunnels 231A-231K connecting VRFs 212 to VRFs 210A-210K on routers 204A-204B. Each of tunnels 231A-231K may represent a SR-MPLSoIPv6 or other type of tunnel mentioned above. Each of routers 204A-204K may be a gateway router for a data center having one or more servers to execute any one or more of CUs 213A-213K. The data center may include a data center fabric to switch mobile data traffic between the router and the CU. In some cases, the one or more servers of the data center may also execute a UPF for the mobile network, in which case the data center fabric may also switch mobile data traffic between the CU and the UPF.

Each of the VRFs 212A-212K has a corresponding virtual network interface to DU 22A. Each of the virtual network interfaces of DU 22A may thus be mapped into a different L3VPN in vCSR 20A in order to, e.g., support a different one of multiple network slices. As described in further detail below, CNI 217 of server 12A, which may be an example of CNI 17A of FIG. 1, when triggered by pod events from orchestrator 50, dynamically adds or deletes virtual network interfaces between the pod (here deployed with DU 22A) and the vRouter 206A, which may also be deployed as container in some examples. CNI 217 also dynamically updates cRPD 24A (the control plane of vCSR 20A) with host routes for each DU 22A/pod virtual network interface and corresponding Layer 3 VPN mappings, in the form of Route Distinguishers and Route Targets. In turn, cRPD 24A programs vRouter 206A (the data plane of vCSR 20A) accordingly, optionally using a gRPC interface. In this way, vCSR 20A is introduced as a cloud-native router into the data path to, e.g., support the F1 interfaces to CUs 213A-213K that may be executing in edge or regional data center sites, for instance. Virtual router 206A may represent a SmartNIC-based virtual router, kernel-based virtual router, or DPDK-based virtual router in various examples.

As an example of techniques of this disclosure, CNI 217 may send a request to vCSR 20A to dynamically add one or more virtual network interfaces between DU 22A and vRouter 206A, and may connect the one or more virtual network interfaces to VRFs 212. In response, vRouter 206A may add the one or more virtual network interfaces, and cRPD 24A may program vRouter 206A to configure the one or more virtual network interfaces with corresponding route information, such as host routes and corresponding Layer 3 VPN mappings.

In accordance with aspects of this disclosure, vCSR 20A may store, in memory of server 12A, container attachment information 225 for attaching DU 22A to vCSR 20A. The container attachment information 225 includes interface information for the one or more virtual interfaces to DU 22A added to vRouter 206A and configuration information for configuring the one or more virtual interfaces, so that vCSR 20A enables network communications by DU 22A (e.g., with CUs 213) via the one or more virtual interfaces of vRouter 206A. vCSR 20A may persist the container attachment information 225 in memory of server 12A. vCSR 20A may store the container attachment information 225 in any suitable format, such as text files, as structured or unstructured data, as a database file, and the like. vCSR 20A may store the interface information for the one or more virtual interfaces to DU 22A added to vRouter 206A and configuration information for configuring the one or more virtual interfaces together in the same file or in separate files.

The interface information for the one or more virtual network interfaces to DU 22A may include a virtual network address (e.g., an IP address) for each of the one or more virtual network interfaces, a subnet of each of the one or more virtual network interfaces, a name or identifier for each of the one or more virtual network interfaces, and the like.

The configuration information for the one or more virtual network interfaces may include configuration information such as a type (e.g., veth, virtio, vhost, fabric interface, etc.) of each of the one or more virtual network interfaces, an interface mode (e.g., access, trunk, L3, etc.) of each of the one or more virtual network interfaces, and the like. The configuration information for the one or more virtual network interfaces may also include route information for the one or more virtual network interfaces, such as a VRF identifier (e.g., of VRFs 212) for each of the one or more virtual network interfaces for DU 22A, a virtual local area network (VLAN) identifier for each of the one or more virtual network interfaces for DU 22A, service labels, routes, forwarding information for the routes, and next-hops for each of the one or more virtual network interfaces, and the like.

In examples where more than one Pod attaches to vCSR 20A via CNI 217, the container attachment information 225 for the Pod may also include or specify a unique identifier for the Pod, e.g., a universally unique identifier (uuid). In examples where the interface information and the configuration information are separately stored in server 12A, the interface information for the Pod and the configuration information for the Pod may each include or specify a unique identifier for the Pod.

After vCSR 20A attaches DU 22A to vRouter 206A, and saves the container attachment information 225 for DU 22A in memory, vCSR 20A may be uninstalled from server 12A, and a new instance of vCSR 20A may be installed on server 12A. Such uninstallation and re-installation of vCSR 20A may include deleting one or more containers in which an older version of vCSR 20A executes and creating one or more new contains for re-installing a newer version of vCSR 20A.

As part of installing a new instance of vCSR 20A on server 12A, server 12A may remove container attachment information for Pods that are no longer running on server 12A from container attachment information 225. Container attachment information 225 may include container attachment information for a plurality of Pods to vCSR 20A, and may include, for each of the plurality of Pods, a unique identifier associated with the container attachment information for the Pod. Server 12A may, as part of or after installing a new instance of vCSR 20A, execute a pre-init job, which may be a Kubernetes job or other type of process, to remove container attachment information for Pods that are no longer running on server 12A from container attachment information 225. For example, the pre-init job may query server 12A for the unique identifiers of Pods currently running on server 12A, compare the unique identifiers of Pods currently running on server 12A with the unique identifiers associated with container attachment information for the Pods in container attachment information 225. The pre-init job may remove, from container attachment information 225, container attachment information for the Pods having unique identifiers that are not in the unique identifiers of Pods currently running on server 12A. In this way, the newly-installed instance of vCSR 20A may avoid attempting to re-attach Pods that are no longer running on server 12A.

After the new instance of vCSR 20A is installed on server 12A, the new instance of vCSR 20A may re-attach Pods currently running on server 12A and which were previously attached to the prior instance of vCSR 20A, as specified in container attachment information 225 persisted to memory by the now-uninstalled prior instance of vCSR 20A. For example, to re-attach DU 22A's network interface to vRouter 206A of the newly installed instance of vCSR 20A, vRouter 206A may create one or more virtual network interfaces for DU 22A according to the interface information for DU 22A stored in container attachment information 225. That is, vRouter 206A may create, in vRouter 206A, one or more virtual network interfaces for DU 22A, as specified in the interface information for DU 22A, having the one or more virtual network addresses and subnets specified in interface information for DU 22A, and the like.

To re-attach DU 22's virtual network interface to vRouter 206A, cRPD 24A may also configure each of the one or more virtual network interfaces for DU 22A in vRouter 206A based on the configuration information stored in memory for DU 22A. For example, cRPD 24A may configure each of the one or more virtual network interfaces for DU 22A in vRouter 206A with the one or more interface types specified in interface information for DU 22A and in the one or more interface modes specified in interface information for DU 22A. CRPD 24A may also configure each of the one or more virtual network interfaces for DU 22A in vRouter 206A with the corresponding VRF identifier (e.g., to attach to VRFs 212) and VLAN identifier, and the like, as specified by the configuration information for DU 22A, and may add corresponding service labels, routes, forwarding information for the routes, next-hops, and the like, such as host routes and corresponding Layer 3 VPN mappings, as specified by the configuration information for DU 22A, to each of the one or more virtual network interfaces for DU 22A. In this way, vCSR 20A may configure vRouter 206A with container attachment information 225 to enable network communications by DU 22 via the one or more virtual network interfaces in vRouter 206A.

Figure 3:
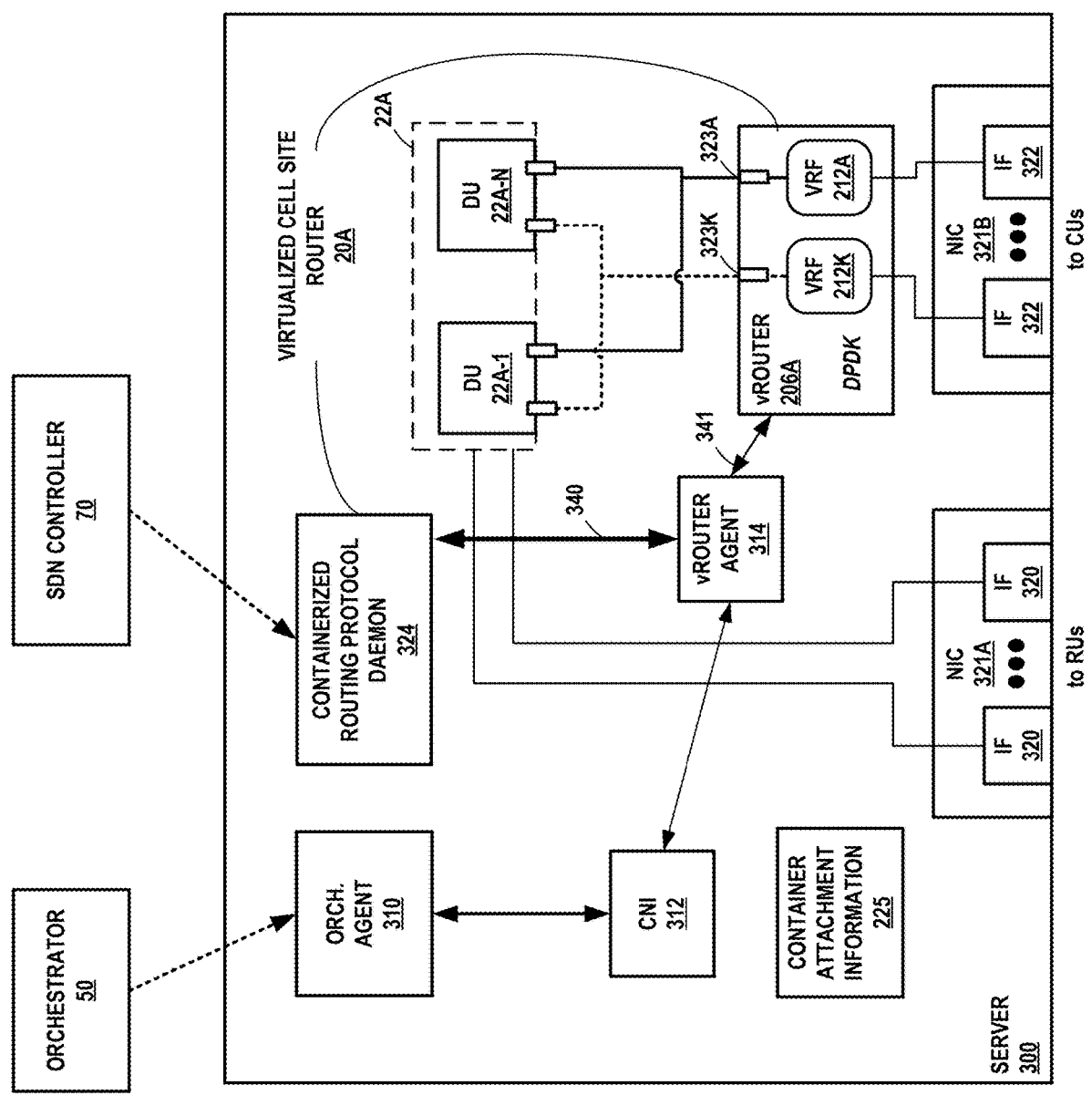
FIG. 3 is a block diagram illustrating example instances of a server that implements a virtualized cell site router provisioned in accordance with techniques of this disclosure.

FIG. 3 is a block diagram illustrating example instances of a server that implements a virtualized cell site router provisioned in accordance with techniques of this disclosure. Servers 300, 350 may each represent any of servers 12 of FIG. 1. In some cases, servers 300, 350 are configured to implement both a virtualized cell site router and distributed unit for same-box forwarding of user traffic, e.g., mobile data traffic, between DU 22A and the data plane of virtualized cell site router 20A. Servers 300, 350 may each be a bare-metal server or a virtual machine. An example hardware architecture for servers 300, 350 is described in FIG. 5.

Servers 300, 350 include one or more network interface cards (NICs) 321A-321B (collectively, "NICs 321") each having one or more hardware interfaces. In a 5G radio access network deployment, interfaces 320 of NIC 321A may be coupled via physical cabling to RUs. Interfaces 320 may implement the F2 interface. Interfaces 322 of NIC 321B may be coupled via physical cabling to the midhaul network, for sending/receiving mobile data traffic to/from CUs. Interfaces 322 may implement the F1 interface.

At a high level, a DPDK-based virtual router data or forwarding plane ("vRouter") 206A is programmed by vRouter agent 314 with forwarding information for implementing a packet fast path. vRouter agent 314 may be a user space process. vRouter agent 314 may have a northbound interface 340 for receiving configuration and routing information from control plane processes, such as cRPD 324. cRPD 324 may be an example of cRPD 24A of FIG. 1. vRouter agent 314 has a southbound interface 341 for programming vRouter 206A. An example implementation for interface 340 is described in further detail with respect to FIG. 4. Reference herein to a "virtual router" may refer to the virtual router forwarding plane specifically, or to a combination of the virtual router forwarding plane (e.g., vRouter 206A) and the corresponding virtual router agent (e.g., vRouter agent 314).

cRPD 324 may have a northbound interface for exchanging configuration and routing information with SDN controller 70. SDN controller 70 may, in some examples, use this interface to provision a VPN in cRPD 324. Container networking interface 312 may be a CNI plugin that configures the interfaces of the container workloads (DUs 22A-1 to 22A-N in this example) with the DPDK-based vRouter 206A. Orchestrator 50 may orchestrate DPDK-based vRouter 206A, cRPD 324, and/or DUs 22 workloads. In some cases, workloads may have multiple interfaces and multiple types of interfaces (e.g., some with vRouter 206A and some with NIC 321A). Thus, CNI 312 may represent a combination of CNIs or unified CNI that is capable of configuring a workload with multiple types of interfaces. The multiple CNIs may be controlled by a master CNI such as Multus. Where orchestrator 50 is a Kubernetes master, CustomResourceDefinitions (CRDs) may be implemented for orchestrator 50 for supporting multi-tenancy and network isolation.

Orchestrator 50 orchestrates pods comprising container workloads. The may include pods comprising cRPD 324, DUs 22A-1 to 22A-N, or DPDK-enabled vRouter 206A. CNI 312 configures virtual interfaces between pods and the data plane, which may be DPDK-based vRouter 206A, a kernel-based vRouter, or a SmartNIC-based vRouter. In some examples, CNI 312 configures a virtio interface for each pod as a vhost-user interface of the DPDK-based vRouter 206A. Such virtual interfaces between DUs 22 and vRouter 206A are illustrated in FIG. 3 as virtual network interfaces 323A-323K (collectively "virtual network interfaces 323"). In some examples, CNI 312 configures veth pairs for each pod to vRouter 206A. vRouter agent 314 may collect and output telemetry data to a telemetry collector, e.g., in the form of syslogs. In some examples, vRouter 206A has a bonded interface to NIC 321B, which may be an Intel-based NIC that supports DPDK. Bonded interfaces facilitate packet load balancing among fabric interfaces. Additional description of configuring virtual interfaces may be found in U.S. Pat. No. 10,728,145, issued Jul. 28, 2020, which is incorporated by reference herein in its entirety.

In a Kubernetes deployment, CNI 312 provides networking for application workloads. This includes, for example, setting up interfaces (e.g., virtual network interfaces 323), IP address management, and access control lists; advertising reachability of workloads within the Kubernetes cluster comprising any of servers 300, 350 (examples of Kubernetes minion nodes); and setting up network namespaces.

CNI 312 may leverage cRPD 324 to expand its control plane capabilities and facilitate virtualized cell site router 20A that is on-box with the application workloads DUs 22A-1 to 22A-N. cRPD 324 may incorporate elements of network service mesh architecture (NSM), service discovery, external endpoints, and tunneling. cRPD 324 may use exterior routing protocols such as Border Gateway Protocol (BGP) to advertise pod reachability both within and outside the Kubernetes cluster. cRPD 324 may use interior gateway and other routing protocols such as IS-IS, OSPF, Label Distribution Protocol (LDP), etc., to participate in underlay networking. cRPD 324 may also provide support for advanced L3VPN overlays using protocols/technologies such as MPLS, MPLSoUDP, or MPLSoGRE tunneling; VxLANs; SR-MPLS, SRv6, SRv4, and/or IPSec.

cRPD 324 operates as the control plane for vCSR 20A, while vRouter 206A operates as the data or forwarding plane for vCSR 20A. CNI 312 leveraging cRPD 324 is thus able to facilitate multi-tenancy using VPNs. As an example, VRF 212A configured for vCSR 20A may be used by vCSR 20A to implement a VPN to support client applications, such as DUs 22A-1 to 22A-N. Orchestrator 50, SDN controller 70, or a combination thereof send configuration data for configuring the VPN in cRPD 324, which communicates forwarding information for the VPN to vRouter 206A (represented in VRF 212A, for example). The VPN forms a user or service plane for DUs 22A-1 to 22A-N to communicate via vCSR 20A with other client applications.

As described above, CNI 312 may communicate with vCSR 20A to attach Pods (e.g., any one or more of DUs 22A-1 to 22A-N) to vRouter 206A. For example, orchestrator 50 may, in response to DU 22A-1 being created, cause CNI 312 to communicate with vCSR 20A to attach DU 22A-1 to vRouter 206A. CNI 312 may send a request to vCSR 20A to dynamically add one or more virtual network interfaces between DU 22A-1 and vRouter 206A, and may connect the one or more virtual network interfaces to VRFs 212. In response, vRouter 206A may add the one or more virtual network interfaces, and cRPD 324 may program vRouter 206A to configure the one or more virtual network interfaces with corresponding route information, such as host routes and corresponding Layer 3 VPN mappings.

In accordance with aspects of this disclosure, vCSR 20A may store, in memory of server 12A, container attachment information 225 for attaching DU 22A to vCSR 20A. The container attachment information 225 for attaching Pods, such as DU 22A-1, to vCSR 20A. The container attachment information 225 may include, for DU 22A-1, interface information for the one or more virtual interfaces to DU 22A-1 added to vRouter 206A and configuration information for configuring the one or more virtual interfaces. vCSR 20A may persist the container attachment information 225 in memory of server 12A. vCSR 20A may store the container attachment information 225 in any suitable format, such as text files, as structured or unstructured data, as a database file, and the like. vCSR 20A may store the interface information for the one or more virtual interfaces to DU 22A-1 added to vRouter 206A and configuration information for configuring the one or more virtual interfaces for DU 22A-1 together in the same file or in separate files.

The interface information for the one or more virtual network interfaces to DU 22A-1 may include a virtual network address (e.g., an IP address) for each of the one or more virtual network interfaces, a subnet of each of the one or more virtual network interfaces, a name or identifier for each of the one or more virtual network interfaces, and the like.

The configuration information for the one or more virtual network interfaces may include configuration information such as a type (e.g., veth, virtio, vhost, fabric interface, etc.) of each of the one or more virtual network interfaces, an interface mode (e.g., access, trunk, L3, etc.) of each of the one or more virtual network interfaces, and the like. The configuration information for the one or more virtual network interfaces may also include route information for the one or more virtual network interfaces, such as a VRF identifier (e.g., of VRFs 212) for each of the one or more virtual network interfaces for DU 22A-1, a virtual local area network (VLAN) identifier for each of the one or more virtual network interfaces for DU 22A-1, service labels, routes, forwarding information for the routes, and next-hops for each of the one or more virtual network interfaces, and the like.

If container attachment information 225 includes container attachment information for a Pod, container attachment information 225 may specify a unique identifier (e.g., a "uuid") for the Pod associated with the container attachment information for the Pod. For example, if container attachment information 225 includes container attachment information for DU 22A-1, container attachment information 225 may specify a unique identifier for DU 22A-1, such as the MAC address assigned to DU 22A-1 that is associated with the container attachment information for DU 22A-1. In examples where the interface information for a Pod and the configuration information for the Pod are stored separately, the interface information for the Pod and the configuration information for the Pod may each specify a unique identifier for the Pod associated with the respective interface information and configuration information for the Pod.

In examples where more than one Pod attaches to vCSR 20A via CNI 312, the container attachment information 225 for the Pod may include or specify a unique identifier for each of the Pods for which container attachment information 225 includes container attachment information. For example, if CNI 312 attaches DU 22A-1 and DU 22A-N to vRouter 206A container attachment information 225 may include container attachment information (e.g., interface information and configuration information) for both DU 22A-1 and DU 22A-N. Container attachment information 225 may specify a unique identifier (e.g., a MAC address of DU 22A-1) for DU 22A-1 that is associated with the container attachment information for DU 22A-1, and may specify a unique identifier for DU 22A-N (e.g., a MAC address of DU 22A-N) that is associated with the container attachment information for DU 22A-N.

After vCSR 20A attaches Pods, such as DU 22A-1 and DU 22A-N to vRouter 206A, and saves the container attachment information 225 for DU 22A-1 and DU 22A-N in memory, vCSR 20A may be uninstalled from server 12A, and then re-installed on server 12A. Such uninstallation and re-installation of vCSR 20A may include deleting one or more containers in which an older version of vCSR 20A executes and creating one or more new contains for re-installing a newer version of vCSR 20A.

As part of or after re-installing vCSR 20A on server 12A, server 12A may remove container attachment information for Pods that are no longer running on server 12A from container attachment information 225. Server 12A may, as part of or after re-installing vCSR 20A, execute a pre-init job, which may be a Kubernetes job or other type of process, to remove container attachment information for Pods that are no longer running on server 12A from container attachment information 225. For example, the pre-init job may query server 12A for the unique identifiers of Pods currently running on server 12A, compare the unique identifiers of Pods currently running on server 12A with the unique identifiers associated with container attachment information for the Pods in container attachment information 225. The pre-init job may remove, from container attachment information 225, container attachment information for Pods having unique identifiers that are not in the unique identifiers of Pods currently running on server 12A. In this way, vCSR 20A may avoid attempting to re-attach Pods that are no longer running on server 12A.

For example, if DU 22A-N stops running before vCSR 20A is re-installed, the pre-init job may determine, based on comparing the unique identifier for DU 22A-N specified in container attachment information 225 with the unique identifiers of Pods currently running on server 12A, that the unique identifier for DU 22A-N specified in container attachment information 225 is not in the unique identifiers of Pods currently running on server 12A. The pre-init job may therefore determine that DU 22A-N is no longer running on server 12A and may remove the container attachment information for DU 22A-N from container attachment information 225.

After the vCSR 20A is re-installed on server 12A, vCSR 20A may re-attach Pods currently running on server 12A and which were previously attached to vCSR 20A, as specified in container attachment information 225. For example, vCSR 20A may determine that container attachment information 225 includes container attachment information (e.g., interface information and configuration information) for DU 22A-1. vCSR 20A may therefore determine to re-attach DU 22A-1 to vCSR 20A.

To re-attach DU 22A-1's network interface to vRouter 206A, vRouter 206A may create one or more virtual network interfaces for DU 22A-1 according to the interface information for DU 22A-1 stored in container attachment information 225. That is, vRouter 206A may create, in vRouter 206A, one or more virtual network interfaces for DU 22A-1, as specified in the interface information for DU 22A-1, having the one or more virtual network addresses and subnets specified in interface information for DU 22A-1, and the like.

To re-attach DU 22A-1's virtual network interface to vRouter 206A, cRPD 324 may also configure each of the one or more virtual network interfaces for DU 22A-1 in vRouter 206A based on the configuration information stored in memory for DU 22A-1. For example, CRPD 324 may configure each of the one or more virtual network interfaces for DU 22A-1 in vRouter 206A with the one or more interface types specified in interface information for DU 22A-1 and in the one or more interface modes specified in interface information for DU 22A-1. cRPD 324 may also configure each of the one or more virtual network interfaces for DU 22A-1 in vRouter 206A with the corresponding VRF identifier (e.g., to attach to VRFs 212) and VLAN identifier, and the like, as specified by the configuration information for DU 22A-1, and may add corresponding service labels, routes, forwarding information for the routes, next-hops, and the like, such as host routes and corresponding Layer 3 VPN mappings, as specified by the configuration information for DU 22A-1, to each of the one or more virtual network interfaces for DU 22A-1.

Figure 4:
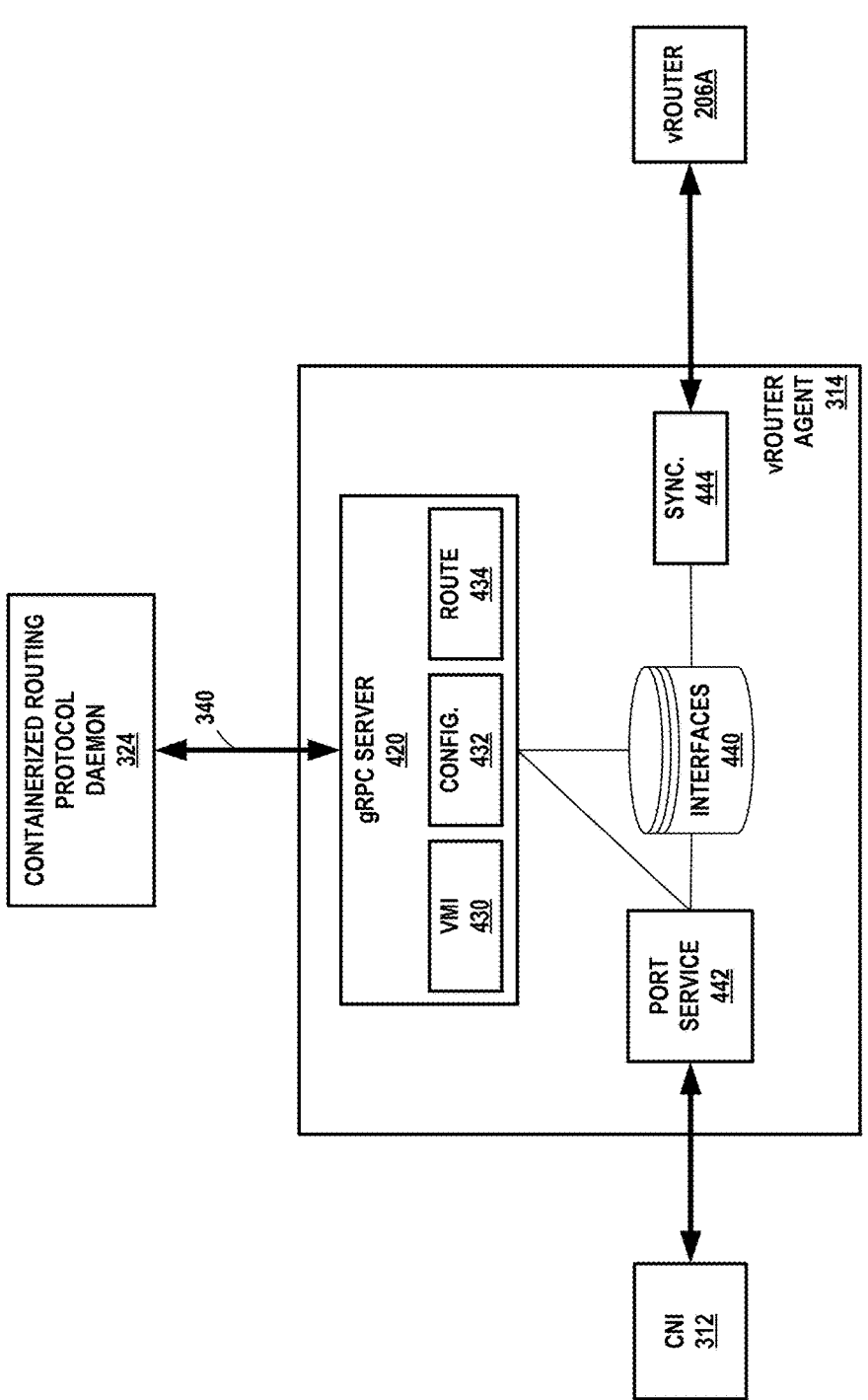
FIG. 4 is a block diagram illustrating an example virtual router agent, according to techniques of this disclosure.

FIG. 4 is a block diagram illustrating an example vRouter agent, according to techniques of this disclosure. vRouter agent 314 includes gRPC server 420 for exchanging data with cRPD 324 (a gRPC client) via a generic interface 340. APIs of gRPC server 420 include virtual machine interface (VMI) APIs 430 for exchanging virtual network interface data and requests, configuration APIs 423 for exchanging configuration data and requests, and route APIs 434 for exchanging routes and requests—including for enabling cRPD 324 to program routes to vRouter 206A via vRouter agent 314. Synchronization module 444 programs vRouter 206A with virtual network interfaces (e.g., part of a veth pair or a virtio-vhost interface between a DPDK pod and DPDK-based vRouter 206A) and programs vRouters 206A with routing information.

Interfaces 440 may represent a data structure that stores data describing virtual network interfaces for application pods executing on the same server that executes vRouter agent 314. Port service 442 listens for requests from CNI 312, such as request to add new "ports" for application pods, which port service 442 may translate to subscribe requests to CRPD 324 via interface 340 to obtain virtual network interface configuration information from cRPD 324. Port service 442 may be implemented using a REST server.

In this way, vRouter agent 314 provides interface 340 to the data plane for overlay traffic sourced by or destined to application pods on the server. This interface 340 may be implemented by any controller, routing protocol process, or other agent because it relies on gRPC rather than a proprietary interface.

CNI 312 may communicate with vRouter agent 314 to add a virtual network interface (e.g., one or more of virtual network interfaces 323) to vRouter 206A to connect a Pod (e.g., one of DUs 22) to vRouter 206A. CNI 312 may have an IP address block reserved for Pods running on the same server as vRouter agent 314. vRouter agent 314 listens for Port-Add and Port-Delete messages, e.g., on a thrift service, where a "port" corresponds to a virtual network interface. To connect a Pod to vRouter 206A, CNI 312 sends a Port-Add message to vRouter agent 314. The Port-Add message includes an identifier for the virtual network for the port and an IP address allocated by CNI 312 for the Pod. vRouter agent 314 may, in response to receiving the Port-Add message, create a virtual network interface (referred to here as a virtual machine interface or VMI, which is an example of a virtual network interface) in interfaces 440. Such a VMI may have a VMI identifier. vRouter agent 314 configures the virtual network interface in vRouter 206A with a default VRF identifier, by sending a VMI Add message to vRouter 206A.

vRouter agent 314 may store, in the memory of a server (e.g., server 12A) on which vRouter agent 314 executes, interface information for the VMI that connects to the Pod. The interface information may include the identifier of the virtual network for the port (e.g., virtual network name) and the IP address allocated by CNI 312 for the pod. In some examples, the interface information for the VMI may also include a type (e.g., veth, virtio, vhost, fabric interface, etc.) of the VMI, an interface mode (e.g., access, trunk, L3, etc.) of the VMI, and the like.

vRouter agent 314 may also subscribe to cRPD 324 by sending, to cRPD 324, a VMI Subscribe message that includes the virtual network name and IP address received in the Port-Add message. In response to receiving the VMI Subscribe message, cRPD 324 sends a VMI Config message to vRouter agent 314 with the correct VRF identifier for virtual network for the virtual network interface, and may optionally add a VRF to vRouter agent 314 if needed with by sending a VRF Add message to vRouter agent 314. vRouter agent 314 send a VMI Update message with the correct VRF identifier to vRouter 206A to cause vRouter 206A to attach the virtual network interface to the correct VRF. In some examples, CRPD 324 may also send information for the VMI, such as a type (e.g., veth, virtio, vhost, fabric interface, etc.) of the VMI, an interface mode (e.g., access, trunk, L3, etc.) of the VMI, and the like, to vRouter agent 314 for configuring the virtual network interface.

cRPD 324 may allocate a service label and adds a route and next-hop (e.g., an MPLS route for BGP IP-VPNs) by sending a Route Add message to vRouter agent 314. cRPD 324 may also advertises a route for reaching the Pod to its peer routers, which may include other cRPDs, routers in the underlay network, or other routers. vRouter agent 314 may configure vRouter 206A with forwarding information (e.g., route, next-hop, label) for the route received in the Route Add message from cRPD 324.

In some examples, cRPD 324 may receive such configuration information for configuring the VMI that connects to the Pod (e.g., VRF identifier, type of the VMI, interface mode of the VMI, service label, routes, next-hops, etc.) from CNI 312. That is, CNI 312 may push, to cRPD 324, such configuration information for configuring the VMI that connects to the Pod.

cRPD 324 may store, in the memory of a server (e.g., server 12A) on which vRouter agent 314 executes, such configuration information for configuring the VMI that connects to the Pod. The interface information for the VMI and the configuration information for the VMI may together be the container attachment information for the VMI. The configuration information may include route information for the VMI, such as the VRF identifier for the VMI, a service label for the VMI, routes and next-hops for the VMI, and/or other forwarding information for the routes for the VMI.

After vCSR 20A attaches a Pod to vRouter 206A, and saves the container attachment information for the Pod in memory, vCSR 20A may be uninstalled from server 12A and then re-installed on server 12A. Such uninstallation and re-installation of vCSR 20A may include deleting one or more containers in which an older version of vCSR 20A executes and creating one or more new contains for re-installing a newer version of vCSR 20A.

After the vCSR 20A is re-installed on server 12A, vCSR 20A may re-attach Pods currently running on server 12A and which were previously attached to vCSR 20A, to the re-installed vCSR 20A using the persisted container attachment information stored in memory. To re-attach a Pod's network interface to vRouter 206A, vRouter 206A may create a VMI for the Pod according to the interface information for the Pod stored in memory. For example, vRouter agent 314 may create a VMI in interfaces 440 having an VMI identifier and an IP address as specified in the interface information for the Pod. In some examples, vRouter agent 314 may also create the VMI to have a specific interface type and/or interface mode as specified in the interface information for the Pod.

vRouter agent 314 may subscribe to cRPD 324 by sending, to cRPD 324, a VMI Subscribe message that includes the virtual network name and IP address for the VMI, as specified in the interface information for the Pod. In response to receiving the VMI Subscribe message, cRPD 324 may determine the VRF identifier for the Pod as specified in the configuration information for the Pod and may sends a VMI Config message to vRouter agent 314 with the VRF identifier for virtual network for the virtual network interface, and may optionally add a VRF to vRouter agent 314 if needed with by sending a VRF Add message to vRouter agent 314. vRouter agent 314 send a VMI Update message with the correct VRF identifier to vRouter 206A to cause vRouter 206A to attach the virtual network interface to the correct VRF. cRPD 324 may also determine route information for the VMI, such as the VRF identifier for the VMI, a service label for the VMI, routes and next-hops for the VMI, and/or other forwarding information for the routes for the VMI, as specified in the configuration information for the Pod and may send a Route Add message to vRouter agent 314. vRouter agent 314 may configure vRouter 206A with the routing and forwarding information (e.g., route, next-hop, label) for the route received in the Route Add message from cRPD 324. In this way, vCSR 20A and vRouter agent 314 may re-attach a Pod running on the server to vCSR 20A after reinstallation of vCSR 20A.

Figure 5:
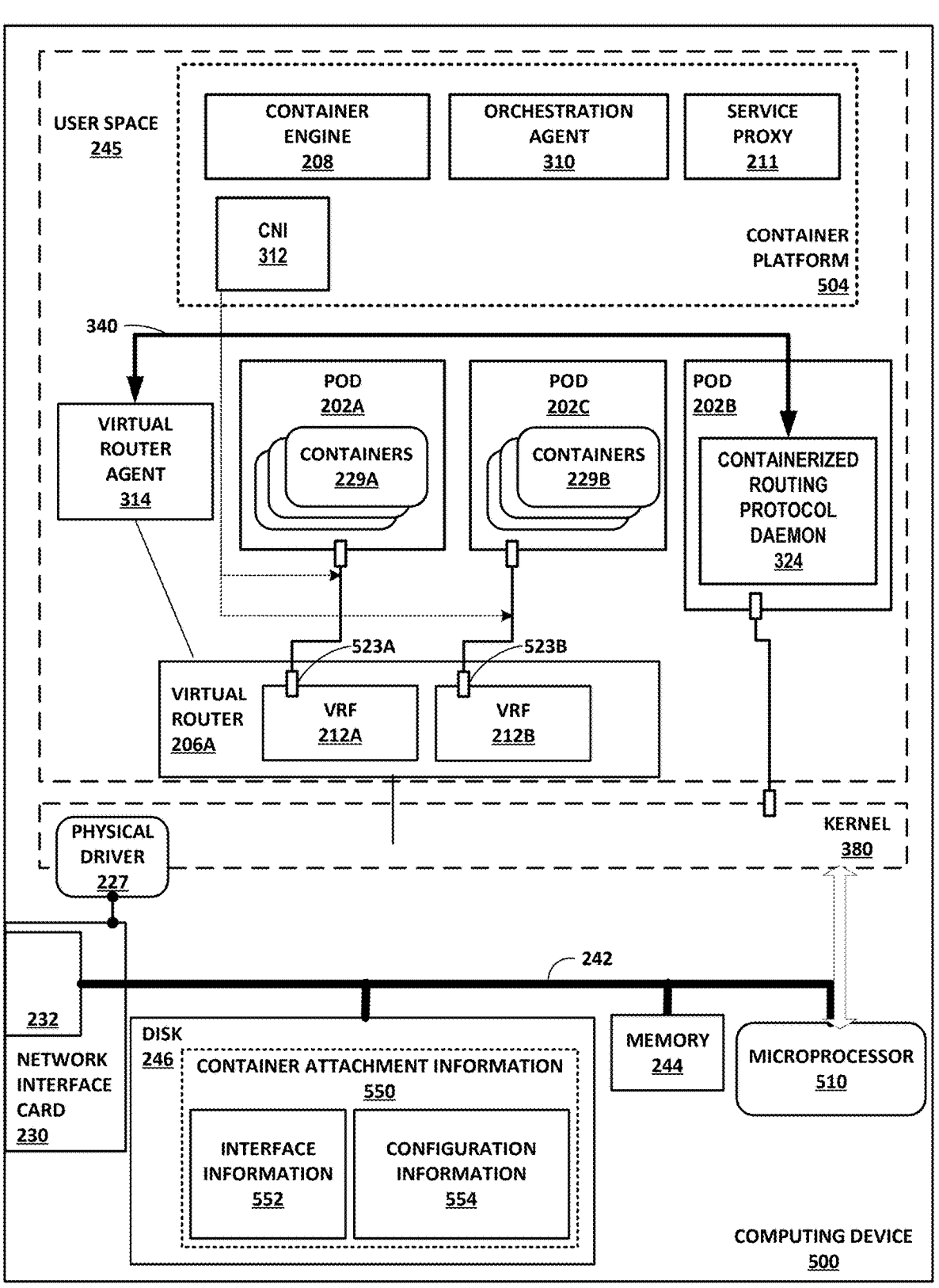
FIG. 5 is a block diagram of an example computing device (e.g., host), according to techniques described in this disclosure.

FIG. 5 is a block diagram of an example computing device (e.g., host), according to techniques described in this disclosure. Computing device 500 of FIG. 5 may represent a real or virtual server and may represent an example instance of any of servers 12 of FIG. 1, or server 300 of FIG. 3. Computing device 500 includes in this example, a bus 242 coupling hardware components of a computing device 500 hardware environment. Bus 242 couples network interface card (NIC) 230, storage disk 246, and one or more microprocessors 210 (hereinafter, "microprocessor 510"). NIC 230 may be SR-IOV-capable. A front-side bus may in some cases couple microprocessor 510 and memory device 244. In some examples, bus 242 may couple memory device 244, microprocessor 510, and NIC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 510 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 510.

Memory device 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory device 244 provides a physical address space composed of addressable memory locations. In some examples, memory device 244 and disk 246 may both be referred to as "memory" throughout this disclosure.

Network interface card (NIC) 230 includes one or more interfaces 232 configured to exchange packets using links of an underlying physical network. Interfaces 232 may include a port interface card having one or more network ports. NIC 230 may also include an on-card memory to, e.g., store packet data. Direct memory access transfers between the NIC 230 and other devices coupled to bus 242 may read/ write from/to the NIC memory.

Memory device 244, NIC 230, storage disk 246, and microprocessor 510 may provide an operating environment for a software stack that includes an operating system kernel 380 executing in kernel space. Kernel 380 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 380 provides an execution environment for one or more processes in user space 245.

Kernel 380 includes a physical driver 227 to use the network interface card 230. Network interface card 230 may also implement SR-IOV to enable sharing the physical network function (I/O) among one or more virtual execution elements, such as containers 229A-229B or one or more virtual machines (not shown in FIG. 2). Shared virtual devices such as virtual functions may provide dedicated resources such that each of the virtual execution elements may access dedicated resources of NIC 230, which therefore appears to each of the virtual execution elements as a dedicated NIC. Virtual functions may represent lightweight PCIe functions that share physical resources with a physical function used by physical driver 227 and with other virtual functions. For an SR-IOV-capable NIC 230, NIC 230 may have thousands of available virtual functions according to the SR-IOV standard, but for I/O-intensive applications the number of configured virtual functions is typically much smaller.

Computing device 500 may be coupled to a physical network switch fabric that includes an overlay network that extends switch fabric from physical switches to software or "virtual" routers of physical servers coupled to the switch fabric, including virtual router 206A. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 500 of FIG. 5, virtual router 206A executes within user space as a DPDK-based virtual router, but virtual router 206A may execute within a hypervisor, a host operating system, a host application, or a virtual machine in various implementations.

Virtual router 206A may replace and subsume the virtual routing/bridging functionality of the Linux bridge/OVS module that is commonly used for Kubernetes deployments of pods 202A-202C (collectively "pods 202"). Virtual router 206A may perform bridging (e.g., E-VPN) and routing (e.g., L3VPN, IP-VPNs) for virtual networks. Virtual router 206A may perform networking services such as applying security policies, NAT, multicast, mirroring, and load balancing.

Virtual router 206A can be executing as a kernel module or as a user space DPDK process (virtual router 206A is shown here in user space 245). Virtual router agent 314 may also be executing in user space. In the example computing device 500 of FIG. 5, virtual router 206A executes within user space as a DPDK-based virtual router, but virtual router 206A may execute within a hypervisor, a host operating system, a host application, or a virtual machine in various implementations. Virtual router agent 314 has a connection to SDN controller 70 using a channel, which is used to download configurations and forwarding information. Virtual router agent 314 programs this forwarding state to the virtual router data (or "forwarding") plane represented by virtual router 206A. Virtual router 206A and virtual router agent 314 may be processes.

Virtual router 206A may replace and subsume the virtual routing/bridging functionality of the Linux bridge/OVS module that is commonly used for Kubernetes deployments of pods 202. Virtual router 206A may perform bridging (e.g., E-VPN) and routing (e.g., L3VPN, IP-VPNs) for virtual networks. Virtual router 206A may perform networking services such as applying security policies, NAT, multicast, mirroring, and load balancing.

Virtual router 206A may be multi-threaded and execute on one or more processor cores. Virtual router 206A may include multiple queues. Virtual router 206A may implement a packet processing pipeline. The pipeline can be stitched by the virtual router agent 314 from the simplest to the most complicated manner depending on the operations to be applied to a packet. Virtual router 206A may maintain multiple instances of forwarding bases. Virtual router 206A may access and update tables using RCU (Read Copy Update) locks.

To send packets to other compute nodes or switches, virtual router 206A uses one or more physical interfaces 232. In general, virtual router 206A exchanges overlay packets with workloads, such as VMs or pods 202 (in FIG. 5). Virtual router 206A has multiple virtual network interfaces (e.g., vifs). These interfaces may include the kernel interface, vhost0, for exchanging packets with the host operating system; an interface with virtual router agent 314, pkt0, to obtain forwarding state from the network controller and to send up exception packets. There may be one or more virtual network interfaces corresponding to the one or more physical network interfaces 232.

Other virtual network interfaces of virtual router 206A are for exchanging packets with the workloads. Virtual network interfaces inserted into virtual router 206A are illustrated in FIG. 5. Virtual network interfaces may be any of the aforementioned types of virtual interfaces. In some cases, virtual network interfaces are tap interfaces.

In a kernel-based deployment of virtual router 206A (not shown), virtual router 206A is installed as a kernel module inside the operating system. Virtual router 206A registers itself with the TCP/IP stack to receive packets from any of the desired operating system interfaces that it wants to. The interfaces can be bond, physical, tap (for VMs), veth (for containers) etc. Virtual router 206A in this mode relies on the operating system to send and receive packets from different interfaces. For example, the operating system may expose a tap interface backed by a vhost-net driver to communicate with VMs. Once virtual router 206A registers for packets from this tap interface, the TCP/IP stack sends all the packets to it. Virtual router 206A sends packets via an operating system interface. In addition, NIC queues (physical or virtual) are handled by the operating system. Packet processing may operate in interrupt mode, which generates interrupts and may lead to frequent context switching. When there is a high packet rate, the overhead attendant with frequent interrupts and context switching may overwhelm the operating system and lead to poor performance.

In a DPDK-based deployment of virtual router 206A, virtual router 206A is installed as a user space 245 application that is linked to the DPDK library. This may lead to faster performance than a kernel-based deployment, particularly in the presence of high packet rates. The physical interfaces 232 are used by the poll mode drivers (PMDs) of DPDK rather the kernel's interrupt-based drivers. The registers of physical interfaces 232 may be exposed into user space 245 in order to be accessible to the PMDs; a physical interface 232 bound in this way is no longer managed by or visible to the host operating system, and the DPDK-based virtual router 206A manages the physical interface 232. This includes packet polling, packet processing, and packet forwarding. In other words, user packet processing steps are performed by the virtual router 206A DPDK data plane. The nature of this "polling mode" makes the virtual router 206A DPDK data plane packet processing/forwarding much more efficient as compared to the interrupt mode when the packet rate is high. There are comparatively few interrupts and context switching during packet I/O, compared to kernel-mode virtual router 206A, and interrupt and context switching during packet I/O may in some cases be avoided altogether.

Each of pods 202 may be a logically-related group of one or more containers, such as a Kubernetes pod. For example, pod 202A includes containers 229A and pod 202C includes containers 229B.

In general, each of pods 202A-202C may be assigned one or more virtual network addresses for use within respective virtual networks, where each of the virtual networks may be associated with a different virtual subnet provided by virtual router 206A. Pod 202B may be assigned its own virtual layer three (L3) IP address, for example, for sending and receiving communications but may be unaware of an IP address of the computing device 500 on which the pod 202B executes. The virtual network address may thus differ from the logical address for the underlying, physical computer system, e.g., computing device 500.

Computing device 500 includes a virtual router agent 314 that controls the overlay of virtual networks for computing device 500 and that coordinates the routing of data packets within computing device 500. In general, virtual router agent 314 communicates with SDN controller 70 for the virtualization infrastructure, which generates commands to create virtual networks and configure network virtualization endpoints, such as computing device 500 and, more specifically, virtual router 206A, as well as virtual network interfaces. By configuring virtual router 206A based on information received from SDN controller 70, virtual router agent 314 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 229A-229B within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 206A. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 206A performs tunnel encapsulation/decapsulation for packets sourced by/destined to any containers of pods 202, and virtual router 206A exchanges packets with pods 202 via bus 242 and/or a bridge of NIC 230.

As noted above, a SDN controller 70 may provide a logically centralized controller for facilitating operation of one or more virtual networks. The SDN controller 70 may, for example, maintain a routing information base, e.g., one or more routing tables that store routing information for the physical network as well as one or more overlay networks. Virtual router 206A implements one or more virtual routing and forwarding instances (VRFs) 212A and 212B (collectively "VRFs 212") for respective virtual networks for which virtual router 206A operates as respective tunnel endpoints. In general, each VRF 212 stores forwarding information for the corresponding virtual network and identifies where data packets are to be forwarded and whether the packets are to be encapsulated in a tunneling protocol, such as with a tunnel header that may include one or more headers for different layers of the virtual network 202 protocol stack. Each of VRFs 212 may include a network forwarding table storing routing and forwarding information for the virtual network.

NIC 230 may receive tunnel packets. Virtual router 206A processes the tunnel packet to determine, from the tunnel encapsulation header, the virtual network of the source and destination endpoints for the inner packet. Virtual router 206A may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 212A. VRF 212A may include forwarding information for the inner packet. For instance, VRF 212A may map a destination layer 3 address for the inner packet to a virtual network interface. VRF 212A forwards the inner packet via virtual network interface to pod 202A in response.

Containers 229A and 229B may each also source inner packets as source virtual network endpoints. Containers 229A and 229B, for instance, may each generate a layer 3 inner packet destined for a destination virtual network endpoint that is executed by another computing device (i.e., not computing device 500) or for another one of containers. Pod 202A may send the layer 3 inner packet to virtual router 206A via virtual network interface 523A attached to VRF 212A, and pod 202C may send the layer 3 inner packet to virtual router 206A via virtual network interface 523B attached to VRF 212B.

In the example of pod 202A, virtual router 206A receives the inner packet and layer 2 header and determines a virtual network for the inner packet. Virtual router 206A may determine the virtual network using any of the above-described virtual network interface implementation techniques (e.g., macvlan, veth, etc.). Virtual router 206A uses the VRF 212A corresponding to the virtual network for the inner packet to generate an outer header for the inner packet, the outer header including an outer IP header for the overlay tunnel and a tunnel encapsulation header identifying the virtual network. Virtual router 206A encapsulates the inner packet with the outer header. Virtual router 206A may encapsulate the tunnel packet with a new layer 2 header having a destination layer 2 address associated with a device external to the computing device 500, e.g., a TOR switch 16 or one of servers 12. If external to computing device 500, virtual router 206A outputs the tunnel packet with the new layer 2 header to NIC 230 using physical function 221. NIC 230 outputs the packet on an outbound interface. If the destination is another virtual network endpoint executing on computing device 500, virtual router 206A routes the packet to the appropriate one of the virtual network interfaces.

In some examples, a controller for computing device 500 (e.g., SDN controller 70 of FIG. 1) configures a default route in each of pods 202 to cause the virtual machines 224 to use virtual router 206A as an initial next hop for outbound packets. In some examples, NIC 230 is configured with one or more forwarding rules to cause all packets received from virtual machines 224 to be switched to virtual router 206A.

Pod 202A includes one or more application containers 229A. Pod 202B includes an instance of cRPD 324. Pod 202C includes one or more application containers 229B. Container platform 504 includes container engine 208, orchestration agent 310, service proxy 211, and CNI 312.

Container engine 208 includes code executable by microprocessor 510. Container engine 208 may be one or more computer processes. Container engine 208 runs containerized applications in the form of containers 229A-229B. Container engine 208 may represent a Dockert, rkt, or other container engine for managing containers. In general, container engine 208 receives requests and manages objects such as images, containers, networks, and volumes. An image is a template with instructions for creating a container. A container is an executable instance of an image. Based on directives from orchestration agent 310, container engine 208 may obtain images and instantiate them as executable containers in pods 202A-202C.

Service proxy 211 includes code executable by microprocessor 510. Service proxy 211 may be one or more computer processes. Service proxy 211 monitors for the addition and removal of service and endpoints objects, and it maintains the network configuration of the computing device 500 to ensure communication among pods and containers, e.g., using services. Service proxy 211 may also manage iptables to capture traffic to a service's virtual IP address and port and redirect the traffic to the proxy port that proxies a backed pod. Service proxy 211 may represent a kube-proxy for a minion node of a Kubernetes cluster. In some examples, container platform 504 does not include a service proxy 211 or the service proxy 211 is disabled in favor of configuration of virtual router 206A and pods 202 by CNI 312.

Orchestration agent 310 includes code executable by microprocessor 510. Orchestration agent 310 may be one or more computer processes. Orchestration agent 310 may represent a kubelet for a minion node of a Kubernetes cluster. Orchestration agent 310 is an agent of an orchestrator, e.g., orchestrator 50 of FIG. 1, that receives container specification data for containers and ensures the containers execute by computing device 500. Container specification data may be in the form of a manifest file sent to orchestration agent 310 from orchestrator 50 or indirectly received via a command line interface, HTTP endpoint, or HTTP server. Container specification data may be a pod specification (e.g., a PodSpec—a YAML (Yet Another Markup Language) or JSON object that describes a pod) for one of pods 202 of containers 229. Based on the container specification data, orchestration agent 310 directs container engine 208 to obtain and instantiate the container images for containers 229, for execution of containers 229 by computing device 500.

Orchestration agent 310 instantiates or otherwise invokes CNI 312 to configure one or more virtual network interfaces for each of pods 202. For example, orchestration agent 310 receives a container specification data for pod 202A and directs container engine 208 to create the pod 202A with containers 229A based on the container specification data for pod 202A. Orchestration agent 310 also invokes the CNI 312 to configure, for pod 202A, virtual network interface 523A for a virtual network corresponding to VRFs 212A. In this example, pod 202A is a virtual network endpoints for a virtual network corresponding to VRF 212A.

Similarly, orchestration agent 310 receives a container specification data for pod 202C and directs container engine 208 to create the pod 202C with containers 229B based on the container specification data for pod 202C. Orchestration agent 310 also invokes the CNI 312 to configure, for pod 202C, virtual network interface 523B for a virtual network corresponding to VRFs 212B. In this example, pod 202C is a virtual network endpoints for a virtual network corresponding to VRF 212B.

CNI 312 may obtain interface configuration data for configuring virtual network interfaces for pods 202. Examples of such interface configuration data may include, for each of pods 202, a network attachment definition (NAD) for the corresponding pod.

Virtual router agent 314 operates as a virtual network control plane module for enabling SDN controller 70 to configure virtual router 206A. Unlike the orchestration control plane (including the container platforms 504 for minion nodes and the master node(s), e.g., orchestrator 50), which manages the provisioning, scheduling, and managing virtual execution elements, a virtual network control plane (including SDN controller 70 and virtual router agent 314 for minion nodes) manages the configuration of virtual networks implemented in the data plane in part by virtual routers 206A of the minion nodes. Virtual router agent 314 communicates, to CNI 312, interface configuration data for virtual network interfaces to enable an orchestration control plane element (i.e., CNI 312) to configure the virtual network interfaces according to the configuration state determined by the SDN controller 70, thus bridging the gap between the orchestration control plane and virtual network control plane. In addition, this may enable a CNI 312 to obtain interface configuration data for multiple virtual network interfaces for a pod and configure the multiple virtual network interfaces, which may reduce communication and resource overhead inherent with invoking a separate CNI 312 for configuring each virtual network interface.

CNI 312 may communicate with vRouter 206A, virtual router agent 314, and cRPD 324 to attach Pods (e.g., pods 202A and 202C) to vRouter 206A. For example, orchestration agent 310 and/or container engine 208 may, in response to pod 202A being created, cause CNI 312 to communicate with vRouter 206A, virtual router agent 314, and/or cRPD 324 to attach pod 202A to vRouter 206A.

CNI 312 may send a request to virtual router agent 314 to dynamically add virtual network interface 523A between pod 202A and vRouter 206A. The request may be in the form of a Port Add message that includes an identifier for the virtual network for the port and an IP address allocated by CNI 312 for pod 202A. vRouter agent 314 may, in response to receiving the Port Add message, create a virtual network interface 523A (also referred to here as a virtual machine interface or VMI, which is an example of a virtual network interface). Such a VMI may have a VMI identifier. vRouter agent 314 configures virtual network interface 523A in vRouter 206A with a default VRF identifier, by sending a VMI Add message to vRouter 206A.

vRouter agent 314 may store, in disk 246, interface information 552 for pod 202A. Interface information 552 may include the identifier of the virtual network for virtual network interface 523A (e.g., virtual network name) and the IP address allocated by CNI 312 for pod 202A. vRouter agent 314 may also store, in interface information 552, a unique identifier of pod 202A, such as the MAC address of pod 202A or another suitable unique identifier, that associated with interface information 552 for pod 202A. Interface information 552 for pod 202A and configuration information 854A for pod 202A may collectively be container attachment information 550 for pod 202A.

To add virtual network interface 523A between pod 202A and vRouter 206A, CNI 312 may also push configuration information for virtual network interface 523A to cRPD 324. Such configuration information may include a type (e.g., veth, virtio, vhost, fabric interface, etc.) of virtual network interface 523A, an interface mode (e.g., access, trunk, L3, etc.) of virtual network interface 523A, a VRF identifier (e.g., of VRF 212A) for the virtual network for virtual network interface 523A, and the like.

vRouter agent 314 may subscribe to cRPD 324 by sending, to cRPD 324, a VMI Subscribe message for virtual network interface 523A that includes the virtual network name and IP address received in the Port Add message. In response to receiving the VMI Subscribe message, cRPD 324 sends a VMI Config message to vRouter agent 314 with the correct VRF identifier for virtual network for the virtual network interface, and may optionally add a VRF to vRouter agent 314 if needed with by sending a VRF Add message to vRouter agent 314. vRouter agent 314 send a VMI Update message with the correct VRF identifier to vRouter 206A to cause vRouter 206A to attach the virtual network interface to the correct VRF (e.g., VRF 212A). In some examples, cRPD 324 may also send additional information regarding virtual network interface 523A, such as a type (e.g., veth, virtio, vhost, fabric interface, etc.) of virtual network interface 523A, an interface mode (e.g., access, trunk, L3, etc.) of virtual network interface 523A, a VRF identifier (e.g., of VRF 212A) for the virtual network for virtual network interface 523A, and the like to vRouter agent 314 to apply to virtual network interface 523A.

cRPD 324 may allocate a service label and adds a route and next-hop (e.g., an MPLS route for BGP IP-VPNs) by sending a Route Add message to vRouter agent 314. cRPD 324 may also advertises a route for reaching the Pod to its peer routers, which may include other cRPDs, routers in the underlay network, or other routers. vRouter agent 314 may configure vRouter 206A with forwarding information (e.g., route, next-hop, label) for the route received in the Route Add message from cRPD 324.

cRPD 324 may store, in disk 246, configuration information 554 for configuring virtual network interface 523A connected to pod 202A. Configuration information 554 for pod 202A may include a type (e.g., veth, virtio, vhost, fabric interface, etc.) of virtual network interface 523A, an interface mode (e.g., access, trunk, L3, etc.) of virtual network interface 523A, a VRF identifier (e.g., of VRF 212A) for the virtual network for virtual network interface 523A, and the like. Configuration information 554 for pod 202A may also include route information for the VMI, such as the VRF identifier for the VMI, a service label for the VMI, routes and next-hops for the VMI, and/or other forwarding information for the routes for the VMI. cRPD 324 may also store, in configuration information 554, a unique identifier of pod 202A, such as the MAC address of pod 202A or another suitable unique identifier, that associated with configuration information 554 for pod 202A.

As described above, virtual router agent 314 and cRPD 324 may store container attachment information 550 in disk 246 for each pod connected to vRouter 206A using CNI 312. Container attachment information 550 for each pod may include interface information 552 for each pod connected to vRouter 206A and configuration information 554 for each pod connected to vRouter 206A. Virtual router agent 314 and cRPD 324 may store, in container attachment information 550, a unique identifier for each pod connected to vRouter 206A and may associate the unique identifier for each pod with the corresponding interface information and configuration information for the pod.

Container attachment information 550 may be stored in disk 246 in any suitable format, such as text files, as structured or unstructured data, as a database file, and the like. In some examples, interface information 552 and configuration information 554 may be stored together in the same file or in separate files.

The interface information 552 for the one or more virtual network interfaces to pod 202A may include a virtual network address (e.g., an IP address) for each of the one or more virtual network interfaces (e.g., virtual network interface 523A), a subnet of each of the one or more virtual network interfaces, a name or identifier for each of the one or more virtual network interfaces, and the like.

The configuration information 554 for the one or more virtual network interfaces of pod 202A may include configuration information such as a type (e.g., veth, virtio, vhost, fabric interface, etc.) of each of the one or more virtual network interfaces, an interface mode (e.g., access, trunk, L3, etc.) of each of the one or more virtual network interfaces, and the like. The configuration information for the one or more virtual network interfaces may also include route information for the one or more virtual network interfaces, such as a VRF identifier (e.g., of VRFs 212) for each of the one or more virtual network interfaces for pod 202A, a virtual local area network (VLAN) identifier for each of the one or more virtual network interfaces for pod 202A, service labels, routes, forwarding information for the routes, and next-hops for each of the one or more virtual network interfaces, and the like.

In examples where more than one pod attaches to vRouter 206A via CNI 312, the container attachment information 550 may include or specify a unique identifier for each of the pods for which container attachment information 550 includes container attachment information. For example, if CNI 312 attaches pod 202A and pod 202C to vRouter 206A container attachment information 550 may include container attachment information (e.g., interface information 552 and configuration information 554) for both pod 202A and pod 202C. Container attachment information 550 may specify a unique identifier (e.g., a MAC address of pod 202A) for pod 202A that is associated with the container attachment information for pod 202A, and may specify a unique identifier for pod 202C (e.g., a MAC address of pod 202C) that is associated with the container attachment information for pod 202C.

After pods, such as pods 202A and 202C are attached to virtual router 206A, virtual router 206A and cRPD 324 may be uninstalled from computing device 500. After virtual router 206A and cRPD 324 are uninstalled from computing device 500, virtual router 206A and cRPD 324 may be re-installed onto computing device 500. For example, virtual router 206A and cRPD 324 may be uninstalled and re-installed to upgrade virtual router 206A and CRPD 324 to a newer version.

As part of or after re-installing virtual router 206A and cRPD 324 on computing device 500, computing device 500 may remove container attachment information for Pods that are no longer running on computing device 500 from container attachment information 550. Orchestration agent 310 may, as part of or after re-installing virtual router 206A and CRPD 324, execute a pre-init job, which may be a Kubernetes job or other type of process, to remove container attachment information for pods that are no longer running on computing device 500 from container attachment information 550. For example, the pre-init job may query (e.g., container engine 208 and/or orchestration agent 310) for the unique identifiers of pods currently running on computing device 500, compare the unique identifiers of pods currently running on computing device 500 with the unique identifiers associated with container attachment information for the pods in container attachment information 550. The pre-init job may remove, from container attachment information 550, container attachment information for pods having unique identifiers that are not in the unique identifiers of pods currently running on computing device. In this way, virtual router 206A may avoid attempting to re-attach pods that are no longer running on computing device 500.

For example, if pod 202C stops running before virtual router 206A and cRPD 324 are re-installed, the pre-init job may determine, based on comparing the unique identifier for pod 202C specified in container attachment information 550 with the unique identifiers of pods currently running on computing device 500, that the unique identifier for pod 202C specified in container attachment information 550 is not in the unique identifiers of pods currently running on computing device 500. The pre-init job may therefore determine that pod 202C is no longer running on computing device 500 and may remove the container attachment information for pod 202C from container attachment information 550.

After virtual router 206A and cRPD 324 are re-installed on computing device 500, vRouter 206A may re-attach pods currently running on computing device 500 and which were previously attached to vRouter 206A, as specified in container attachment information 550. For example, vRouter 206A may determine that container attachment information 550 includes container attachment information (e.g., interface information 552 and configuration information 554) for pod 202A. vRouter 206A may therefore determine to re-attach pod 202A to vRouter 206A.

To re-attach pod 202A's network interface to vRouter 206A, vRouter 206A may create virtual network interface 523A for pod 202A according to the interface information 552 for pod 202A. For example, vRouter agent 314 may create virtual network interface 523A having an VMI identifier and an IP address as specified in the interface information 552 for pod 202A. In some examples, vRouter agent 314 may also create the VMI to have a specific interface type and/or interface mode as specified in the interface information 552 for pod 202A.

vRouter agent 314 may subscribe to cRPD 324 by sending, to cRPD 324, a VMI Subscribe message that includes the virtual network name and IP address for virtual network interface 523A, as specified in the interface information 552 for pod 202A. In response to receiving the VMI Subscribe message, cRPD 324 may determine the VRF identifier for virtual network interface 523A as specified in the configuration information 554 for pod 202A and may sends a VMI Config message to vRouter agent 314 with the VRF identifier for virtual network for virtual network interface 523A, and may optionally add a VRF to vRouter agent 314 if needed with by sending a VRF Add message to vRouter agent 314. vRouter agent 314 send a VMI Update message with the correct VRF identifier to vRouter 206A to cause vRouter 206A to attach virtual network interface 523A to the correct VRF.

In some examples, cRPD 324 may also send additional information regarding virtual network interface 523A, such as a type (e.g., veth, virtio, vhost, fabric interface, etc.) of virtual network interface 523A, an interface mode (e.g., access, trunk, L3, etc.) of virtual network interface 523A, a VRF identifier (e.g., of VRF 212A) for the virtual network for virtual network interface 523A, and the like, as specified in configuration information 554 for pod 202A, to vRouter agent 314 to apply to virtual network interface 523A.

cRPD 324 may also determine route information for the VMI, such as the VRF identifier for the VMI, a service label for the VMI, routes and next-hops for the VMI, and/or other forwarding information for the routes for the VMI, as specified in configuration information 554 for pod 202A and may send a Route Add message to vRouter agent 314. vRouter agent 314 may configure virtual network interface 523A in vRouter 206A with the routing and forwarding information (e.g., route, next-hop, label) for the route received in the Route Add message from cRPD 324. In this way, vCSR 20A and vRouter agent 314 may re-attach pod 202A running on the server to vRouter 206A after reinstallation of vRouter 206A and cRPD 324.

In Kubernetes (K8s) cluster, DPDK applications are run inside Pods. K8s takes care of orchestrating (lifecycle management) of these Pods. Since these applications in the Pod need network connectivity, K8s uses a component called CNI to setup network interfaces, IP address assignment and routing.

In an aspect of the disclosure, a set of software components provides CNI functionality that address networking requirements unique to cloud native 5G network environments. The software components include a containerized routing protocol daemon (cRPD) to support a Network Service Mesh (NSM) architecture. The set of software components support NSM architecture and may provide additional capabilities such as hybrid networking (between physical and virtual infrastructure), direct reachability to a Pod from outside a cluster of compute nodes to, e.g., advertise over protocols such as BGP, set up tunnels dynamically using various technologies such as MPLS, SRv6, IP-IP/VxLAN/GRE, IPsec, etc.

In a use case of this aspect, a 5G O-RAN network may be deployed using cloud native technologies and follow the 5G split in which the DU (Distributed Unit) and CSR (Cell Site Router) are virtualized and run on a compute node. The set of software components may operate as a cell-site router to provide L3 reachability for the mid-haul for the 5G network.

The software components use cRPD to distribute Layer 3 (L3) network reachability information of the Pods not just within the cluster, but also outside the cluster. The cRPD also programs the data plane on each compute node. For better network packet I/O performance, the DU application may run in the application Pod to bypasses the kernel networking stack and abstractions, and thereby use, e.g., zero-copy mechanisms to directly send/receive packets from the physical NIC. Data Plane Development Kit (DPDK) is one such framework, and a DPDK-based virtual router may be used as a user space data plane that leverages DPDK for high forwarding performance for this purpose.

The software components may include a DPDK-based virtual router to support DPDK applications. A CNI plugin manages the DPDK configuration for application and programs the virtual router. This may include setting up a vhost control channel and assigning IP (e.g., both IPv4 and IPv6) and MAC addresses, advertising the Pod IP addresses, and detecting and withdrawing the routes when the Pod is considered down or removed.

Most of the existing use cases for cRPD either provide control-plane-only routing functionality such as BGP Route Reflectors or drive the forwarding-planes: kernel-based or ASIC based forwarding-plane on white box platforms. The rise of containers and cloud computing led to the need for container orchestration platforms to manage the life cycle of the containers. Kubernetes (K8s) is an orchestration platform for running containerized applications in a clustered computing environment. It provides automatic deployment, scaling, networking and management of containerized applications. A K8s pod consists of one or more containers representing an instance of application and is the smallest unit that K8s can handle. All containers in the pod share the same network namespace. Container Network Interface (CNI) provides networking for application pods in Kubernetes. It takes care of setting up pod interfaces, address assignment and networking between pods in a k8s cluster and network isolation between different workloads.

CNI 312 may implement CNI functionality along with capabilities useful for supporting Network Service Mesh (NSM) architecture.

While there exist many CNI solutions, mainly catering to the data-center use cases, the techniques described herein may address the networking requirements unique to cloud native 5G environment by interacting with cRPD 324 to provide NSM functionality. A CNI that supports NSM architecture provides additional capabilities such as hybrid networking (between physical and virtual infrastructure), direct reachability to Pod from outside the cluster such, for example: advertise over protocols such as BGP, setup tunnels dynamically using various technologies such as MPLS, SRv6, IP-IP/VxLAN/GRE, IPsec, etc.

A 5G O-RAN network may be deployed using cloud native technologies and follows 5G 7.2 split where the DU (Distributed Unit) and CSR (Cell Site Router) are virtualized and run on a server. CNI 312 acts as a cell-site router to provide L3 reachability for the mid-haul.

cRPD 324 distribute Layer-3 network reachability information of the Pods not just within a Kubernetes cluster (in Kubernetes deployments), but also outside the cluster. cRPD 324 also takes care of programming the forwarding-plane on each compute node/server.

For better network packet I/O performance, a DU application which runs in the application Pod bypasses the kernel networking stack and abstractions, and uses (zero-copy) mechanisms to directly send/receive packets from the physical NIC. Data Plane Development Kit (DPDK) is one such framework.

DPDK vRouter 206A is a user space data-plane that leverages DPDK for high forwarding performance. vRouter 206A supports DPDK applications. CNI 312 will take care of setting up DPDK configuration for applications and programming vrouter 206A. This includes setting up of vhost control channel and assigning IP (both IPv4 and IPv6)

and mac addresses, advertise the Pod IP addresses and detect and withdraw the routes when the Pod is considered down or removed.

FIG. 6 is a flowchart illustrating an example mode of operation for a multi-stage provisioning workflow according to techniques of this disclosure. The operation is described with respect to computing device 500 of FIG. 5.

As shown in FIG. 6, a containerized router configured to execute on the processing circuitry 510 may, as part of an initialization process, read, from memory, container attachment information 550 persisted to memory by a prior instance of the containerized router (602). The containerized router includes a containerized virtual router 206A configured to implement a data plane for the containerized router and a containerized routing protocol process 324 configured to implement a control plane for the containerized router.

In some examples, the container attachment information 550 include interface information 552 for one or more virtual interfaces in the containerized virtual router that connect to the logically-related group of one or more containers and configuration information 554 for configuring the one or more virtual interfaces that connects to the logically-related group of one or more containers.

In some examples, the interface information 552 include one or more of a virtual network address associated with each of the one or more virtual network interfaces 523A or a virtual network identifier for each of the one or more virtual network interfaces 523A, and wherein the configuration information include one or more of information for configuring the one or more virtual network interfaces 523A or route information for the one or more virtual network interfaces 523A.

In some examples, the interface information 552 include one or more of a virtual network address associated with each of the one or more virtual network interfaces 523A or a virtual network identifier for each of the one or more virtual network interfaces 523A, and wherein the configuration information include one or more of information for configuring the one or more virtual network interfaces 523A or route information for the one or more virtual network interfaces 523A.

The containerized router executing on processing circuitry 510 may, as part of the initialization process, configure the containerized router with the container attachment information 550 to enable network communications by a logically-related group of one or more containers via the containerized router (604).

In some examples, to the containerized virtual router 206A of the prior instance of the containerized router may store the interface information 552 for the one or more virtual interfaces 523A that connect to the logically-related group of one or more containers, and the containerized routing protocol process 324 of the prior instance of the containerized router may store the configuration information 554 for configuring the one or more virtual interfaces 523A that connects to the logically-related group of one or more containers.

In some examples, to configure the containerized router to enable the network communications by the logically-related group of one or more containers, the containerized router may add, based on the interface information 552, the one or more virtual network interfaces 523A that connects to the logically-related group of one or more containers to the containerized virtual router 206A and may configure, based on the configuration information 554, the one or more virtual network interfaces 523A.

In some examples, to configure the containerized router to enable the network communications by the logically-related group of one or more containers based on the container attachment information 550, the containerized router may re-attach the logically-related group of one or more containers to the containerized router without receiving, after re-installation of the containerized router, a second request from a CNI plugin 312 to attach the logically-related group of one or more containers to the containerized router and without re-starting the logically-related group of one or more containers.

In some examples, the container attachment information 550 includes information for attaching each of a plurality of logically-related groups of one or more containers to the containerized router, including, for each of the plurality of logically-related groups of one or more containers, a corresponding unique identifier. Processing circuitry 510 may determine, based on the corresponding, unique identifier for each of the plurality of logically-related groups of one or more containers, that one or more of the plurality of logically-related groups of one or more containers specified in the container attachment information 550 are no longer running on the processing circuitry 510. Processing circuitry 510 may remove information for the one or more of the plurality of logically-related groups of one or more containers from the container attachment information 550. To configure the containerized router to enable the network communications by the logically-related group of one or more containers, the containerized router may configure the containerized router to enable the network communications by each of a remaining one or more logically-related groups of one or more containers specified in the container attachment information 550 via the containerized router based on the container attachment information 550.

In some examples, the logically-related group of one or more containers is a Kubernetes pod 202A.

In some examples, a container network interface (CNI) plugin 312 may send, to the prior instance of the containerized router, a request to attach the logically-related group of one or more containers to the containerized router. The prior instance of the containerized router may, in response to receiving the request from the CNI plugin 312, determine, based on the request, the container attachment information 550 for attaching the logically-related group of one or more containers to the prior instance of the containerized router. The prior instance of the containerized router may attach the logically-related group of one or more containers to the prior instance of the containerized router based on the container attachment information 550. The prior instance of the containerized router may store, based on the request and in the memory, the container attachment information 550.

Aspects of this disclosure include the following clauses.

Clause 1. A computing device comprising: memory; processing circuitry communicably coupled to the memory; a containerized router configured to execute on the processing circuitry, wherein the containerized router includes a containerized virtual router configured to implement a data plane for the containerized router and a containerized routing protocol process configured to implement a control plane for the containerized router, wherein the containerized router is configured to, as part of a containerized router initialization process: read container attachment information from the memory, the container attachment information persisted to the memory by a prior instance of the containerized router; and configure the containerized router with the container attachment information to enable network communications by a logically-related group of one or more containers via the containerized router.

Clause 2. The computing device of clause 1, wherein the container attachment information comprise interface information for one or more virtual network interfaces in the containerized virtual router that connect to the logically-related group of one or more containers and configuration information for configuring the one or more virtual network interfaces that connects to the logically-related group of one or more containers.

Clause 3. The computing device of clause 2, wherein the interface information include one or more of a virtual network address associated with each of the one or more virtual network interfaces or a virtual network identifier for each of the one or more virtual network interfaces, and wherein the configuration information include one or more of information for configuring the one or more virtual network interfaces or route information for the one or more virtual network interfaces.

Clause 4. The computing device of any of clauses 2 and 2, wherein to configure the containerized router with the container attachment information, the containerized router is further configured to: add, based on the interface information, the one or more virtual network interfaces that connects to the logically-related group of one or more containers to the containerized virtual router; and configure, based on the configuration information, the one or more virtual network interfaces.

Clause 5. The computing device of any of clauses 2-4, wherein the containerized virtual router of the prior instance of the containerized router is configured to store the interface information for the one or more virtual network interfaces that connect to the logically-related group of one or more containers; and wherein the containerized routing protocol process of the prior instance of the containerized router is configured to store the configuration information for configuring the one or more virtual network interfaces that connects to the logically-related group of one or more containers.

Clause 6. The computing device of any of clauses 1-5, wherein to configure the containerized router to enable the network communications by the logically-related group of one or more containers via the containerized router, the containerized router is further configured to: re-attach the logically-related group of one or more containers to the containerized router, without receiving, after installation of the containerized router, a request from a container network interface (CNI) plugin to attach the logically-related group of one or more containers executing on the processing circuitry to the containerized router and without re-starting the logically-related group of one or more containers.

Clause 7. The computing device of any of clauses 1-6, wherein the container attachment information includes information for attaching each of a plurality of logically-related groups of one or more containers to the containerized router, including, for each of the plurality of logically-related groups of one or more containers, a corresponding unique identifier, wherein the processing circuitry is further configured to: determine, based on the corresponding, unique identifier for each of the plurality of logically-related groups of one or more containers, that one or more of the plurality of logically-related groups of one or more containers specified in the container attachment information are no longer running on the processing circuitry; and remove information for the one or more of the plurality of logically-related groups of one or more containers from the container attachment information, wherein to configure the containerized router with the container attachment information to enable the network communications by the logically-related group of one or more containers, the containerized router is further configured to configure the containerized router with the container attachment information to enable the network communications by each of a remaining one or more logically-related groups of one or more containers specified in the container attachment information via the containerized router based on the container attachment information.

Clause 8. The computing device of any of clauses 1-7, wherein the logically-related group of one or more containers comprises a Kubernetes pod.

Clause 9. The computing device of any of clauses 1-8, further comprising a container network interface (CNI) plugin configured to execute on the processing circuitry and to send, to the prior instance of the containerized router, a request to attach the logically-related group of one or more containers to the containerized router; wherein the prior instance of the containerized router is further configured to: in response to receiving the request from the CNI plugin, determine, based on the request, the container attachment information for attaching the logically-related group of one or more containers to the prior instance of the containerized router; attach the logically-related group of one or more containers to the prior instance of the containerized router based on the container attachment information; and store, based on the request and in the memory, the container attachment information.

Clause 10. A method comprising: reading, by a containerized router executing on processing circuitry as part of an initialization process, container attachment information from memory, the container attachment information persisted to the memory by a prior instance of the containerized router, wherein the containerized router includes a containerized virtual router configured to implement a data plane for the containerized router and a containerized routing protocol process configured to implement a control plane for the containerized router; and configuring, by the containerized router executing on the processing circuitry as part of the initialization process, the containerized router with the container attachment information to enable network communications by a logically-related group of one or more containers via the containerized router.

Clause 11. The method of clause 10, wherein the container attachment information comprise interface information for one or more virtual network interfaces in the containerized virtual router that connect to the logically-related group of one or more containers and configuration information for configuring the one or more virtual network interfaces that connects to the logically-related group of one or more containers.

Clause 12. The method of clause 11, wherein the interface information include one or more of a virtual network address associated with each of the one or more virtual network interfaces or a virtual network identifier for each of the one or more virtual network interfaces, and wherein the configuration information include one or more of information for configuring the one or more virtual network interfaces or route information for the one or more virtual network interfaces.

Clause 13. The method of any of clauses 11 and 12, wherein configuring the containerized router with the container attachment information comprises: adding, by the containerized router executing on the processing circuitry and based on the interface information, the one or more virtual network interfaces that connects to the logically-related group of one or more containers to the containerized virtual router; and configuring, by the containerized router executing on the processing circuitry and based on the configuration information, the one or more virtual network interfaces.

Clause 14. The method of any of clauses 11-13, further comprising: storing, by the containerized virtual router of the prior instance of the containerized router, the interface information for the one or more virtual network interfaces that connect to the logically-related group of one or more containers; and storing, by the containerized routing protocol process of the prior instance of the containerized router, the configuration information for configuring the one or more virtual network interfaces that connects to the logically-related group of one or more containers.

Clause 15. The method of any of clauses 10-14, wherein configuring, by the containerized router, the containerized router to enable the network communications by the logically-related group of one or more containers further comprises: re-attaching, by the containerized router executing on the processing circuitry, the logically-related group of one or more containers to the containerized router, without receiving, after re-installation of the containerized router, a second request from a container network interface (CNI) plugin to attach the logically-related group of one or more containers executing on the processing circuitry to the containerized router and without re-starting the logically-related group of one or more containers.

Clause 16. The method of any of clauses 10-15, wherein the container attachment information includes information for attaching each of a plurality of logically-related groups of one or more containers to the containerized router, including, for each of the plurality of logically-related groups of one or more containers, a corresponding unique identifier, further comprising: determining, by the processing circuitry and based on the corresponding, unique identifier for each of the plurality of logically-related groups of one or more containers, that one or more of the plurality of logically-related groups of one or more containers specified in the container attachment information are no longer running on the processing circuitry; and removing, by the one or more processing circuitry, information for the one or more of the plurality of logically-related groups of one or more containers from the container attachment information; wherein configuring, by the containerized router executing on the processing circuitry, the containerized router with the container attachment information to enable the network communications by the logically-related group of one or more containers further comprises configuring, by the containerized router executing on the processing circuitry, the containerized router to enable the network communications by each of a remaining one or more logically-related groups of one or more containers specified in the container attachment information via the containerized router based on the container attachment information.

Clause 17. The method of any of clauses 10-16, wherein the logically-related group of one or more containers comprise a Kubernetes pod.

Clause 18. The method of any of clauses 10-17, further comprising: sending, by a container network interface (CNI) plugin executing on the processing circuitry, to the prior instance of the containerized router, a request to attach the logically-related group of one or more containers to the containerized router; in response to receiving the request from the CNI plugin, determining, by the prior instance of the containerized router executing on the processing circuitry and based on the request, the container attachment information for attaching the logically-related group of one or more containers to the prior instance of the containerized router; attaching, by the prior instance of the containerized router executing on the processing circuitry, the logically-related group of one or more containers to the prior instance of the containerized router based on the container attachment information; and storing, by the prior instance of the containerized router executing on the processing circuitry, and based on the request and in the memory, the container attachment information.

Clause 19. Non-transitory computer-readable storage media, storing instructions, which when executed by processing circuitry of a computing device, cause the processing circuitry to: reading, by a containerized router executing on the processing circuitry, container attachment information from memory, the container attachment information persisted to the memory by a prior instance of the containerized router, wherein the containerized router includes a containerized virtual router configured to implement a data plane for the containerized router and a containerized routing protocol process configured to implement a control plane for the containerized router; and configuring, by the containerized router executing on the processing circuitry, the containerized router with the container attachment information to enable network communications by a logically-related group of one or more containers via the containerized router.

Clause 20. The non-transitory computer-readable storage media of clause 19, wherein the container attachment information comprise interface information for one or more virtual network interfaces in the containerized virtual router that connect to the logically-related group of one or more containers and configuration information for configuring the one or more virtual network interfaces that connects to the logically-related group of one or more containers.

The techniques described herein may be implemented in hardware, software, firmware, or any combination thereof. Various components, functional units, and/or modules illustrated in the figures and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing device comprising:
memory;
processing circuitry communicably coupled to the memory;
a containerized router configured to execute on the processing circuitry, wherein the containerized router includes a containerized virtual router configured to implement a data plane for the containerized router and a containerized routing protocol process configured to implement a control plane for the containerized router, wherein the containerized router is configured to, as part of a containerized router initialization process:
read container attachment information from the memory, the container attachment information persisted to the memory by a prior instance of the containerized router; and
configure the containerized router with the container attachment information to enable network communications by a logically-related group of one or more containers via the containerized router.

2. The computing device of claim 1, wherein the container attachment information comprise interface information for one or more virtual network interfaces in the containerized virtual router that connect to the logically-related group of one or more containers and configuration information for configuring the one or more virtual network interfaces that connects to the logically-related group of one or more containers.

3. The computing device of claim 2, wherein the interface information include one or more of a virtual network address associated with each of the one or more virtual network interfaces or a virtual network identifier for each of the one or more virtual network interfaces, and wherein the configuration information include one or more of information for configuring the one or more virtual network interfaces or route information for the one or more virtual network interfaces.

4. The computing device of claim 2, wherein to configure the containerized router with the container attachment information, the containerized router is further configured to:
add, based on the interface information, the one or more virtual network interfaces that connects to the logically-related group of one or more containers to the containerized virtual router; and
configure, based on the configuration information, the one or more virtual network interfaces.

5. The computing device of claim 2,
wherein the containerized virtual router of the prior instance of the containerized router is configured to store the interface information for the one or more virtual network interfaces that connect to the logically-related group of one or more containers; and
wherein the containerized routing protocol process of the prior instance of the containerized router is configured to store the configuration information for configuring the one or more virtual network interfaces that connects to the logically-related group of one or more containers.

6. The computing device of claim 1, wherein to configure the containerized router to enable the network communications by the logically-related group of one or more containers via the containerized router, the containerized router is further configured to:
re-attach the logically-related group of one or more containers to the containerized router, without receiving, after installation of the containerized router, a request from a container network interface (CNI) plugin to attach the logically-related group of one or more containers executing on the processing circuitry to the containerized router and without re-starting the logically-related group of one or more containers.

7. The computing device of claim 1, wherein the container attachment information includes information for attaching each of a plurality of logically-related groups of one or more containers to the containerized router, including, for each of the plurality of logically-related groups of one or more containers, a corresponding unique identifier, wherein the processing circuitry is further configured to:
determine, based on the corresponding, unique identifier for each of the plurality of logically-related groups of one or more containers, that one or more of the plurality of logically-related groups of one or more containers specified in the container attachment information are no longer running on the processing circuitry; and remove information for the one or more of the plurality of logically-related groups of one or more containers from the container attachment information, wherein to configure the containerized router with the container attachment information to enable the network communications by the logically-related group of one or more containers, the containerized router is further configured to configure the containerized router with the container attachment information to enable the network communications by each of a remaining one or more logically-related groups of one or more containers specified in the container attachment information via the containerized router based on the container attachment information.

8. The computing device of claim 1, wherein the logically-related group of one or more containers comprises a Kubernetes pod.

9. The computing device of claim 1, further comprising a container network interface (CNI) plugin configured to execute on the processing circuitry and to send, to the prior instance of the containerized router, a request to attach the logically-related group of one or more containers to the containerized router;

wherein the prior instance of the containerized router is further configured to:

in response to receiving the request from the CNI plugin, determine, based on the request, the container attachment information for attaching the logically-related group of one or more containers to the prior instance of the containerized router;

attach the logically-related group of one or more containers to the prior instance of the containerized router based on the container attachment information; and store, based on the request and in the memory, the container attachment information.

10. A method comprising:

reading, by a containerized router executing on processing circuitry as part of an initialization process, container attachment information from memory, the container attachment information persisted to the memory by a prior instance of the containerized router, wherein the containerized router includes a containerized virtual router configured to implement a data plane for the containerized router and a containerized routing protocol process configured to implement a control plane for the containerized router; and configuring, by the containerized router executing on the processing circuitry as part of the initialization process, the containerized router with the container attachment information to enable network communications by a logically-related group of one or more containers via the containerized router.

11. The method of claim 10, wherein the container attachment information comprise interface information for one or more virtual network interfaces in the containerized virtual router that connect to the logically-related group of one or more containers and configuration information for configuring the one or more virtual network interfaces that connects to the logically-related group of one or more containers.

12. The method of claim 11, wherein the interface information include one or more of a virtual network address associated with each of the one or more virtual network interfaces or a virtual network identifier for each of the one or more virtual network interfaces, and wherein the configuration information include one or more of information for configuring the one or more virtual network interfaces or route information for the one or more virtual network interfaces.

13. The method of claim 11, wherein configuring the containerized router with the container attachment information comprises:

adding, by the containerized router executing on the processing circuitry and based on the interface information, the one or more virtual network interfaces that connects to the logically-related group of one or more containers to the containerized virtual router; and configuring, by the containerized router executing on the processing circuitry and based on the configuration information, the one or more virtual network interfaces.

14. The method of claim 11, further comprising:

storing, by the containerized virtual router of the prior instance of the containerized router, the interface information for the one or more virtual network interfaces that connect to the logically-related group of one or more containers; and storing, by the containerized routing protocol process of the prior instance of the containerized router, the configuration information for configuring the one or more virtual network interfaces that connects to the logically-related group of one or more containers.

15. The method of claim 10, wherein configuring, by the containerized router, the containerized router to enable the network communications by the logically-related group of one or more containers further comprises:

re-attaching, by the containerized router executing on the processing circuitry, the logically-related group of one or more containers to the containerized router, without receiving, after re-installation of the containerized router, a second request from a container network interface (CNI) plugin to attach the logically-related group of one or more containers executing on the processing circuitry to the containerized router and without re-starting the logically-related group of one or more containers.

16. The method of claim 10, wherein the container attachment information includes information for attaching each of a plurality of logically-related groups of one or more containers to the containerized router, including, for each of the plurality of logically-related groups of one or more containers, a corresponding unique identifier, further comprising:

determining, by the processing circuitry and based on the corresponding, unique identifier for each of the plurality of logically-related groups of one or more containers, that one or more of the plurality of logically-related groups of one or more containers specified in the container attachment information are no longer running on the processing circuitry; and removing, by the one or more processing circuitry, information for the one or more of the plurality of logically-related groups of one or more containers from the container attachment information;

wherein configuring, by the containerized router executing on the processing circuitry, the containerized router with the container attachment information to enable the network communications by the logically-related group of one or more containers further comprises configuring, by the containerized router executing on the processing circuitry, the containerized router to enable the network communications by each of a remaining one or more logically-related groups of one or more containers specified in the container attachment information via the containerized router based on the container attachment information.

17. The method of claim 10, wherein the logically-related group of one or more containers comprise a Kubernetes pod.

18. The method of claim 10, further comprising:

sending, by a container network interface (CNI) plugin executing on the processing circuitry, to the prior instance of the containerized router, a request to attach the logically-related group of one or more containers to the containerized router;

in response to receiving the request from the CNI plugin, determining, by the prior instance of the containerized router executing on the processing circuitry and based on the request, the container attachment information for attaching the logically-related group of one or more containers to the prior instance of the containerized router;

attaching, by the prior instance of the containerized router executing on the processing circuitry, the logically-related group of one or more containers to the prior instance of the containerized router based on the container attachment information; and storing, by the prior instance of the containerized router executing on the processing circuitry, and based on the request and in the memory, the container attachment information.

19. Non-transitory computer-readable storage media, storing instructions, which when executed by processing circuitry of a computing device, cause the processing circuitry to:

reading, by a containerized router executing on the processing circuitry, container attachment information from memory, the container attachment information persisted to the memory by a prior instance of the containerized router, wherein the containerized router includes a containerized virtual router configured to implement a data plane for the containerized router and a containerized routing protocol process configured to implement a control plane for the containerized router; and configuring, by the containerized router executing on the processing circuitry, the containerized router with the container attachment information to enable network communications by a logically-related group of one or more containers via the containerized router.

20. The non-transitory computer-readable storage media of claim 19, wherein the container attachment information comprise interface information for one or more virtual network interfaces in the containerized virtual router that connect to the logically-related group of one or more containers and configuration information for configuring the one or more virtual network interfaces that connects to the logically-related group of one or more containers.

* * * * *